(12) United States Patent
Birkler

(10) Patent No.: US 11,356,606 B2
(45) Date of Patent: Jun. 7, 2022

(54) IMAGING USING MOBILE COMPUTING DEVICE IN COMMUNICATION WITH WIDE FIELD OF VIEW (FOV) CAMERA

(71) Applicant: InsideMaps Inc., Los Altos, CA (US)

(72) Inventor: Paul Joergen Birkler, Foster City, CA (US)

(73) Assignee: InsideMaps, Inc., Los Alto, CA (US)

( * ) Notice: Subject to any disclaimer, the term of this patent is extended or adjusted under 35 U.S.C. 154(b) by 0 days.

(21) Appl. No.: 16/795,857

(22) Filed: Feb. 20, 2020

(65) Prior Publication Data

US 2020/0275023 A1  Aug. 27, 2020

Related U.S. Application Data

(60) Provisional application No. 62/810,470, filed on Feb. 26, 2019.

(51) Int. Cl.
  *H04N 5/232* (2006.01)
(52) U.S. Cl.
  CPC ..... *H04N 5/23238* (2013.01); *H04N 5/23203* (2013.01); *H04N 5/23222* (2013.01)
(58) Field of Classification Search
  CPC ........... H04N 5/23238; H04N 5/23203; H04N 5/23222
  USPC .......................................................... 348/36
  See application file for complete search history.

(56) References Cited

U.S. PATENT DOCUMENTS

| 5,883,695 | A | 3/1999 | Paul |
| 6,084,592 | A | 7/2000 | Shum et al. |
| 7,536,032 | B2 | 5/2009 | Bell |
| 8,780,180 | B2 | 7/2014 | Parulski |
| 9,244,533 | B2 | 1/2016 | Friend et al. |
| 9,262,673 | B2 | 2/2016 | Shotton et al. |
| 9,269,150 | B1 | 2/2016 | Seitz |
| 9,344,615 | B1 * | 5/2016 | Bostick ............... G06K 7/1417 |
| 9,787,904 | B2 | 10/2017 | Bidder et al. |
| 10,554,896 | B2 | 2/2020 | Birkler |
| 2009/0190798 | A1 | 7/2009 | Lee et al. |

(Continued)

OTHER PUBLICATIONS

Olbrich, Manuel, et al., "Augmented reality supporting user-centric building information management," The Visual Computer, May 2013, vol. 29, Issue 10, pp. 1093-1105.

Azri, Suhaibah, et al., "Automatic Generation of 3D Indoor Models: Current State of the Art and New Approaches," n International Workshop on Geoinformation Advances, Johor, Malaysia, Jan. 2012, http://www.academia.edu/2604376 / [Automatic_Generation_of3D_Indoor_Models_Current_State_oCthe_Art_and_New_Approaches], 13 pages.

(Continued)

*Primary Examiner* — Joseph G Ustaris
*Assistant Examiner* — Jimmy S Lee
(74) *Attorney, Agent, or Firm* — Vierra Magen Marcus LLP

(57) ABSTRACT

Certain embodiments disclosed herein generate an image that is devoid of a person. Such an embodiment can includes using a camera to obtain a first image of a scene while a person is at a first location within the FOV of the camera, obtaining a second image of the scene while the person is at a second location within the FOV of the camera, and generating, based on the first and second images, a third image of the scene, such that the third image of the scene is devoid of the person and includes portions of the scene that were blocked by the person in the first and second images. Other embodiments disclosed herein determine spatial information for one or more items of interest within a graphical representation of a region generated based on one or more images of the region captured using a camera of a mobile device.

21 Claims, 15 Drawing Sheets

(56) References Cited

U.S. PATENT DOCUMENTS

| | | |
|---|---|---|
| 2010/0098328 A1 | 4/2010 | Se et al. |
| 2010/0319100 A1 | 12/2010 | Chen et al. |
| 2011/0199470 A1 | 8/2011 | Moller et al. |
| 2012/0162366 A1 | 6/2012 | Ninan et al. |
| 2013/0004060 A1 | 1/2013 | Bell et al. |
| 2013/0141524 A1 | 6/2013 | Karunamuni et al. |
| 2013/0229569 A1 | 9/2013 | Bevirt et al. |
| 2013/0250045 A1* | 9/2013 | Ki .................. H04N 13/106 348/36 |
| 2014/0240454 A1 | 8/2014 | Hirata et al. |
| 2014/0300693 A1 | 10/2014 | Hirata et al. |
| 2014/0313289 A1 | 10/2014 | Kim et al. |
| 2015/0103146 A1* | 4/2015 | Rose .................. H04N 13/204 348/47 |
| 2015/0116509 A1 | 4/2015 | Birkler et al. |
| 2015/0229849 A1 | 8/2015 | Shin |
| 2016/0012283 A1 | 1/2016 | Mitoma et al. |
| 2016/0286119 A1* | 9/2016 | Rondinelli ............ G02B 13/06 |
| 2019/0253614 A1* | 8/2019 | Oleson .................. G06T 7/75 |
| 2020/0074668 A1* | 3/2020 | Stenger ................ G06T 7/0002 |

OTHER PUBLICATIONS

Sankar, Aditya, et al., "Capturing indoor scenes with smartphones," In Proceedings of the 25th annual ACM symposium on User interface software and technology (Uist), Acm, New York, Ny, USA, Oct. 2012, 403-411.

Chen, Shenchang Eric, "QuickTime VR: an image-based approach to virtual environment navigation," Proceedings of the 22nd annual conference on Computer graphics and interactive techniques, Sep. 1995, p. 29-38.

Deng, Xiaoming, et al., "Automatic spherical panorama generation with two fisheye images," Proceedings of the 7th Congress on Intelligent Control and Automation, Chongqing, Jun. 2008, pp. 5955-5959.

Bastanlar, Yalin, "Structure-from-Motion for Systems with Perspective and Omnidirectional Cameras," Ph D., Thesis, Middle East Technical University, Jul. 2009, 27 pages.

* cited by examiner

IMAGING USING MOBILE COMPUTING DEVICE IN COMMUNICATION WITH WIDE FIELD OF VIEW (FOV) CAMERA

PRIORITY CLAIM

This application claims priority to U.S. Provisional Patent Application No. 62/810,470, filed Feb. 26, 2019, which is incorporated herein by reference.

BACKGROUND

It is often useful to have a schematic, blueprint or other graphical representation of rooms of a building when either moving furniture, buying new furniture, buying carpets or rugs, remodeling, repainting or otherwise modifying or cataloguing characteristic of rooms or elements therein. Various products exist, which are supposed to assist users in producing such graphical representations. Some such products, which are implemented using software, typically require that a user spend a large amount of time taking manual measurements of rooms and items therein and then manually entering such measurements into a computing device to enable the software running on computing device to generate models based on the manually entered information. More recently, special cameras have been developed that remove some of the manual procedure previously necessary. For example, 360-degree cameras are available that have a field of view (FOV) that covers a full circle in the horizontal plane. Such a camera can be placed in a room (or other region) to obtain a 360-degree image of the room (or other region) from which a virtual tour of the room (or other region) can be generated. One potential problem of using a 360-degree camera is that the person (aka photographer) that is controlling the camera can inadvertently or at least undesirably be captured in the 360-degree image because, unlike when using a more conventional camera having a smaller FOV, the person cannot easily stand outside the FOV of the camera (e.g., by standing behind the camera). One way to overcome this problem is for the person (aka photographer) to place the 360-degree camera on a tripod and then stand in another room and use a remote control to trigger the 360-degree camera. However, such a solution is not optimal as it increases the time and complexity associated with obtaining the 360-degree images of rooms and/or other regions.

After a schematic, blueprint or other graphical representation of a room (or other region) has been generated, it would be useful if certain items of interest in the graphical representation can be tagged and spatial coordinates of such items of interest can be determined. For example, assume a schematic, blueprint or other graphical representation of rooms of a rental unit are being used to specify items of interest that need to be repaired before a tenant either moves into or out of the rental unit. It would be beneficial if the items that need to be repaired can be easily and readily tagged within the schematic, blueprint or other graphical representation in a manner that provides good specificity, e.g., to clearly indicate which one of numerous cabinet pulls in a kitchen needs to be repaired, or to clearly indicate which one of a number of door knobs in a bedroom needs to be repaired.

SUMMARY

Certain embodiments of the present invention can be used to essentially remove a person from an image, or more specifically, to generate an image that is devoid of a person. A method of such an embodiment includes using a camera to obtain a first image (A) of a scene within a FOV of the camera while a person is at a first location within the FOV of the camera, and thus, the person appears in a first portion of the first image (A). The method further includes obtaining a second image (B) of the scene within the FOV of the camera while the person is at a second location within the FOV of the camera that differs from the first location, and thus, the person appears in a second portion of the second image (B) that differs from the first portion of the first image (A). Additionally, the method includes generating, based on the first and second images (A and B), a third image (C) of the scene, such that the third image (C) of the scene is devoid of the person and includes portions of the scene that were blocked by the person in the first and second images (A and B), wherein the generating is performing using one or more processors. While such embodiments are especially useful with a 360-degree camera, such embodiments are also useful with cameras having other FOVs, such as a FOV that is 120 degrees or 180 degrees, but not limited thereto. In certain embodiments, the first and second images (A and B) are captured using a 360-degree camera (or another camera having some other FOV) that is being controlled by a mobile computing device that is in wireless communication camera. Such a mobile computing device that controls the 360-degree camera (or another camera having some other FOV) can be, e.g., a smartphone or a tablet type of mobile computing device, but is not limited thereto. An application installed on such a mobile computing device can be used to control the 360-degree camera (or another camera having some other FOV), as well as to generate the third image (C) of the scene that is device of the person and includes portions of the scene that were blocked by the person in the first and second images (A and B).

In accordance with certain embodiments, the third image (C) of the scene is generate using computer vision to identify the person within each of the first and second images (A and B), and combining a portion of the first image (A) that is devoid of the person with a portion of the second image (B) that is devoid of the person to produce the third image (C) of the scene that is devoid of the person and includes the portions of the scene that were blocked by the person in the first and second images.

In accordance with certain embodiments, the third image (C) of the scene is generated by: identifying first and second portions (A1, A2) of the first image (A) that differ from the second image (B); identifying first and second portions (B1, B2) of the second image (B) that differ from the first image (A); determining a first metric of similarity (a1) indicative of similarity between the first portion (A1) of the first image (A) that differs from the second image (B) and a remaining portion of the first image (A); determining a second metric of similarity (a2) indicative of similarity between the second portion (A2) of the first image (A) that differs from the second image (B) and a remaining portion of the first image (A); determining a third metric of similarity (b1) indicative of similarity between the first portion (B1) of the second image (B) that differs from the first image (A) and a remaining portion of the second image (B); and determining a fourth metric of similarity (b2) indicative of similarity between the second portion (B2) of the second image (B) that differs from the first image (A) and a remaining portion of the first image (A). Further, the third image (C) of the scene is generated by determining, based on the first, second, third, and fourth metrics of similarity (a1, a2, b1, b2), which one of the first portion (A1) of the first image (A) and the first portion (B1) of the second image (B) is to be included the third image (C), and which one of the second portion (A2) of the first image (A) and the second portion (B2) of the second image (B) is to be included the third image (C). More specifically, this may include comparing a sum of the first and fourth metrics (a1+b2) to a sum of the second and third metrics (a2+b3), e.g., to determine whether or not the sum of the first and fourth metrics (a1+b2) is less than the sum of the second and third metrics (a2+b3). Then, based on results of the comparing, there is a determination of which one of the first portion (A1) of the first image (A) and the first portion (B1) of the second image (B) is to be included the third image (C), and which one of the second portion (A2) of the first image (A) and the second portion (B2) of the second image (B) is to be included the third image (C).

In accordance with certain embodiments, for each of the first, second, third, and fourth metrics of similarity (a1, a2, b1, b2), a lower magnitude is indicative of higher similarity, and higher magnitude is indicative of a lower similarity. In such embodiments the comparing comprises determining whether the sum of the first and fourth metrics (a1+b2) is less than or greater than the sum of the second and third metrics (a2+b3). In response to determining that the sum of the first and fourth metrics (a1+b2) is less than the sum of the second and third metrics (a2+b3), there is a determination that the first portion (A1) of the first image (A) and the second portion (B2) of the second image (B) are to be included in the third image (C). On the other hand, in response to determining that the sum of the first and fourth metrics (a1+b2) is greater than the sum of the second and third metrics (a2+b3), there is a determination that the second portion (A2) of the first image (A) and the first portion (B1) of the second image (B) are to be included in the third image (C).

In accordance with other embodiments, for each of the first, second, third, and fourth metrics of similarity (a1, a2, b1, b2), a lower magnitude is indicative of lower similarity, and higher magnitude is indicative of a higher similarity. In such embodiments the comparing comprises determining whether the sum of the first and fourth metrics (a1+b2) is less than or greater than the sum of the second and third metrics (a2+b3). In response to determining that the sum of the first and fourth metrics (a1+b2) is greater than the sum of the second and third metrics (a2+b3), there is a determination that the first portion (A1) of the first image (A) and the second portion (B2) of the second image (B) are to be included in the third image (C). On the other hand, in response to determining that the sum of the first and fourth metrics (a1+b2) is less than the sum of the second and third metrics (a2+b3), there is a determination that the second portion (A2) of the first image (A) and the first portion (B1) of the second image (B) are to be included in the third image (C).

Certain embodiments of the present technology are also directed to one or more processor readable storage devices having instructions encoded thereon which when executed cause one or more processors to perform the methods summarized above.

Certain embodiments of the present technology are related to a method for use with a first mobile device comprising a first camera and a second mobile device, wherein the method is for determining spatial information for one or more items of interest within a graphical representation of a region generated based on one or more images of the region captured using the first camera of the first mobile device. Such a method comprises capturing one or more images of the region using the first camera of the first mobile device and generating or otherwise obtaining the graphical representation of the region based on the one or more images of the region captured using the first camera of the first mobile device. The method also includes, for each item of interest, of the one or more items of interest, using the first camera of the first mobile device to capture one or more further images of the region while the second mobile device is placed in close proximity to the item of interest, and thus, the second mobile device appears in the one or more further images. The method further includes, for each item of interest, of the one or more items of interest, determining spatial information for the item of interest based on the one or more further images of the region within which the second mobile device appears.

In accordance with certain embodiments, the second mobile device includes a front side on which is located a display and a front side camera, and a back side on which is located a back side camera, and the method includes: displaying an indicator on the display of the second mobile device, such that the indicator will be shown in the one or more images of the region captured using the first camera of the first mobile device.

In accordance with certain embodiments, determining spatial information, for an item of interest based on the one or more further images of the region within which the second mobile device appears, comprises intersecting a ray from a center of the first camera of the first mobile device to the second mobile device that appears near the item of interest within the graphical representation of the region.

In accordance with certain embodiments, an item of interest within the graphical representation of the region is identified based on the indicator on the display of the second mobile device included in the one or more images of the region captured using the first camera of the first mobile device.

In accordance with certain embodiments the method further comprises, for each item of interest, of the one or more items of interest: capturing a further image that includes the first mobile device, using the front side camera of the second mobile device; and using the further image, captured using the front side camera of the second mobile device, to increase at least one of reliability or accuracy of the spatial information determined for the item of interest.

In accordance with certain embodiments, the first camera of the first mobile device comprises a 360-degree camera. In accordance with certain embodiments, the second mobile device comprises one of a smartphone or a tablet type of mobile computing device.

In accordance with certain embodiments, determining spatial information, for an item of interest based on the one or more further images of the region within which the second mobile device appears, comprises identifying an arm or other body part of a person holding the second mobile device, and intersecting a ray from a center of the first camera of the first mobile device to the identified arm of other body part of the person located near the item of interest within a graphical representation of the region.

Certain embodiments of the present technology are also directed to one or more processor readable storage devices having instructions encoded thereon which when executed cause one or more processors to perform the methods summarized above.

A system according to certain embodiments of the present technology comprises: a first mobile device comprising a first camera that is used to capture one or more images of a region, which one or more images are used to generate a graphical representation of the region; and a second mobile device comprising one or more processors. In certain such embodiments, the first mobile device is configured to capture using the first camera thereof, for each item of interest of one or more items of interest, one or more further images of the region while the second mobile device is placed in close proximity to the item of interest, and thus, the second mobile device appears in the one or more further images. At least one of the one or more processors of the second mobile device is configured to determine, for each item of interest of the one or more items of interest, spatial information for the item of interest based on the one or more further images of the region within which the second mobile device appears. The graphical representation of the region can be generated using one or more processors of the first mobile device, of the second mobile device and/or of a server that receives the one or more images of the region captured by the first camera of the first mobile device.

In accordance with certain embodiments, at least one of the one or more processors of the second mobile device is configured to determine, for each item of interest of the one or more items of interest, spatial information for the item of interest by intersecting a ray from a center of the first camera of the first mobile device to the second mobile device that appears near the item of interest within the graphical representation of the region.

In accordance with certain embodiments, the second mobile device includes a front side on which is located a display and a front side camera, and a back side on which is located a back side camera; the second mobile device is configured to display an indicator on the display thereof, such that the indicator will be shown in the one or more images of the region captured using the first camera of the first mobile device; and an item of interest within the graphical representation of the region is identified based on the indicator on the display of the second mobile device included in the one or more images of the region captured using the first camera of the first mobile device.

In accordance with certain embodiments, the second mobile device is configured, for each item of interest of the one or more items of interest, to capture a further image that includes the first mobile device, using the front side camera of the second mobile device; and the second mobile device is configured use the further image, captured using the front side camera of the thereof, to increase at least one of reliability or accuracy of the spatial information determined for at least one item of interest.

In accordance with certain embodiments, at least one of the one or more processors of the second mobile device is configured to determine the spatial information for an item of interest by identifying an arm or other body part of a person holding the second mobile device, and intersecting a ray from a center of the first camera of the first mobile device to the identified arm or other body part of the person located near the item of interest within a graphical representation of the region.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
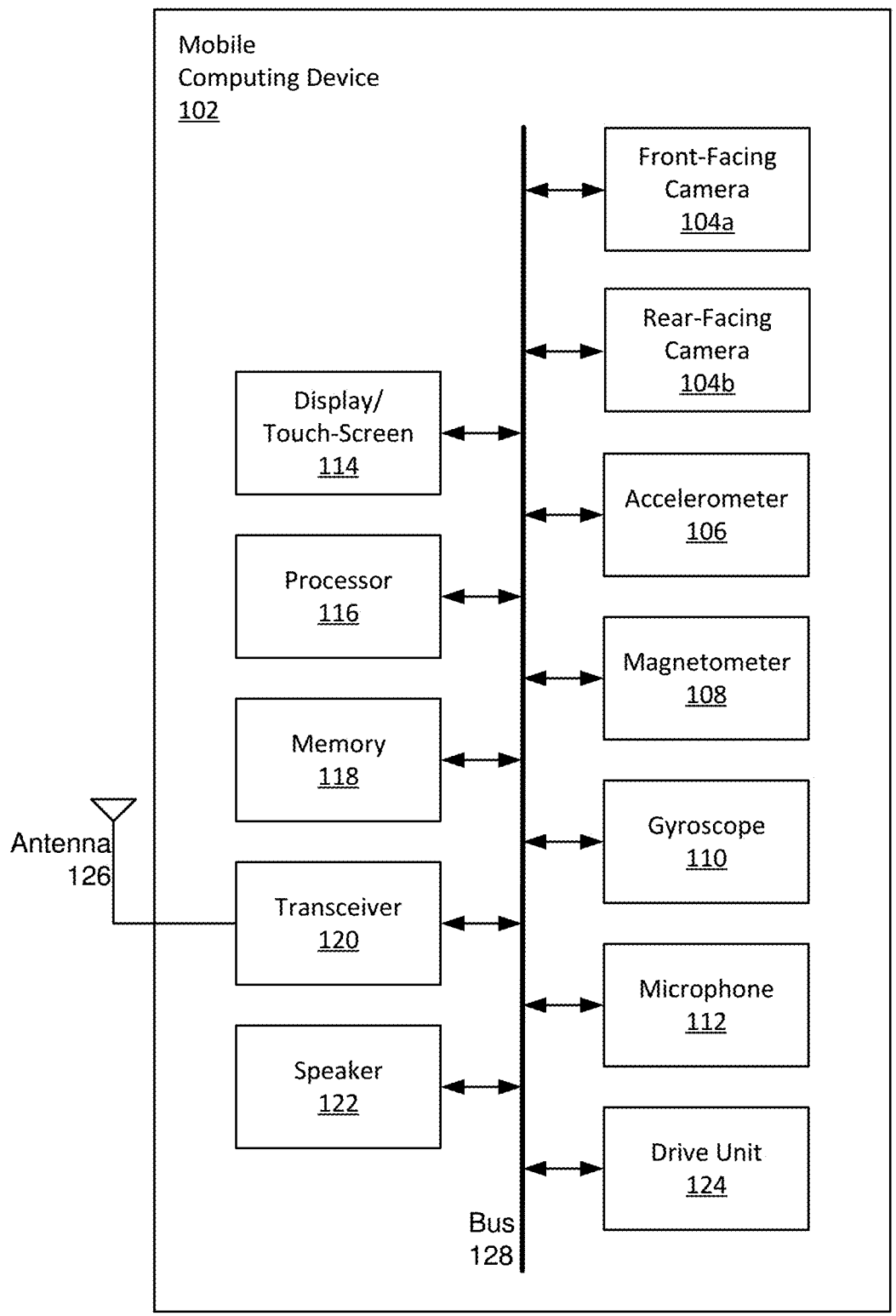
FIG. 1 illustrates an exemplary components of a mobile computing device with which embodiments of the present technology can be used.

FIG. 1 illustrates an exemplary mobile computing device 102 with which embodiments of the present technology described herein can be used. The mobile computing device 102 can be a smartphone, such as, but not limited to, an iPhone™, a Blackberry™, an Android™-based or a Windows™-based smartphone. The mobile computing device 102 can alternatively be a tablet computing device, such as, but not limited to, an iPad™, an Android™-based or a Windows™-based tablet. For another example, the mobile computing device 102 can be iPod Touch™, or the like.

Referring to the block diagram of FIG. 1, the mobile computing device 102 is shown as including a front-facing camera 104a, a rear-facing camera 104b, an accelerometer 106, a magnetometer 108, a gyroscope 110, a microphone 112, a display 114 (which may or may not be a touch screen display), a processor 116, memory 118, a transceiver 120, a speaker 122 and a drive unit 124. Each of these elements is shown as being connected to a bus 128, which enables the various components to communicate with one another and transfer data from one element to another. It is also possible that some of the elements can communicate with one another without using the bus 128.

The front of the mobile computing device 102 is the major side of the device on which the display 114 (which may or may not be a touch screen display) is located, and the back of the mobile computing device 102 is the other or opposite major side. The rear-facing camera 104b is located on the back of the mobile computing device 102. The front-facing camera 142a is located on the front of the mobile computing device 102. The front-facing camera 104a can be used to obtain images or video, typically of the person holding the mobile computing device 102. The rear-facing camera 104b can be used to obtain images or video, typically of a scene and/or of a person other than the person holding the mobile computing device 102.

The accelerometer 106 can be used to measure linear acceleration relative to a frame of reference, and thus, can be used to detect motion of the mobile computing device 102 as well as to detect an angle of the mobile device 102 relative to the horizon or ground. The magnetometer 108 can be used as a compass to determine a direction of magnetic north and bearings relative to magnetic north. The gyroscope 110 can be used to detect both vertical and horizontal orientation of the mobile computing device 102, and together with the accelerometer 106 and magnetometer 108 can be used to obtain very accurate information about the orientation of the mobile computing device 102. The microphone 112 can be used to detect voice commands for controlling the mobile computing device 102, as well as for enabling the mobile computing device 102 to operate as a mobile phone, e.g., if the mobile computing device 102 is a smartphone. It is also possible that the mobile computing device 102 includes additional sensor elements, such as, but not limited to, an ambient light sensor and/or a proximity sensor.

The display 114, which many or not be a touch screen type of display, can be used as a user interface to visually display items (e.g., images, options, instructions, etc.) to a user and accept inputs from a user. Further, the mobile computing device 102 can include additional elements, such as keys, buttons, a track-pad, a trackball, or the like, that accept inputs from a user.

The memory 118 can be used to store software and/or firmware that controls the mobile computing device 102, as well to store images captured using the camera 104, but is not limited thereto. Various different types of memory, including non-volatile and volatile memory can be included in the mobile computing device 102. The drive unit 124, e.g., a hard drive, but not limited thereto, can also be used to store software that controls the mobile computing device 102, as well to store images captured using the camera 104, but is not limited thereto. The memory 118 and the disk unit 124 can include a machine readable medium on which is stored one or more sets of executable instructions (e.g., apps) embodying one or more of the methodologies and/or functions described herein. In place of the drive unit 124, or in addition to the drive unit, the mobile computing device can include a solid-state storage device, such as those comprising flash memory or any form of non-volatile memory. The term "machine-readable medium" as used herein should be taken to include all forms of storage media, either as a single medium or multiple media, in all forms; e.g., a centralized or distributed database and/or associated caches and servers; one or more storage devices, such as storage drives (including e.g., magnetic and optical drives and storage mechanisms), and one or more instances of memory devices or modules (whether main memory, cache storage either internal or external to a processor, or buffers. The term "machine-readable medium" or "computer-readable medium" shall be taken to include any tangible non-transitory medium which is capable of storing or encoding a sequence of instructions for execution by the machine and that cause the machine to perform any one of the methodologies. The term "non-transitory medium" expressly includes all forms of storage drives (optical, magnetic, etc.) and all forms of memory devices (e.g., DRAM, Flash (of all storage designs), SRAM, MRAM, phase change, etc., as well as all other structures designed to store information of any type for later retrieval.

The transceiver 120, which is connected to an antenna 126, can be used to transmit and receive data wirelessly using, e.g., Wi-Fi, cellular communications or mobile satellite communications. The mobile computing device 102 may also be able to perform wireless communications using Bluetooth and/or other wireless technologies. It is also possible the mobile computing device 102 includes multiple types of transceivers and/or multiple types of antennas.

The speaker 122 can be used to provide auditory instructions, feedback and/or indicators to a user, playback recordings (e.g., musical recordings), as well as to enable the mobile computing device 102 to operate as a mobile phone.

The processor 116 can be used to control the various other elements of the mobile computing device 102, e.g., under control of software and/or firmware stored in the memory 118 and/or drive unit 124. It is also possible that there are multiple processors 116, e.g., a central processing unit (CPU) and a graphics processing unit (GPU).

Figure 2:
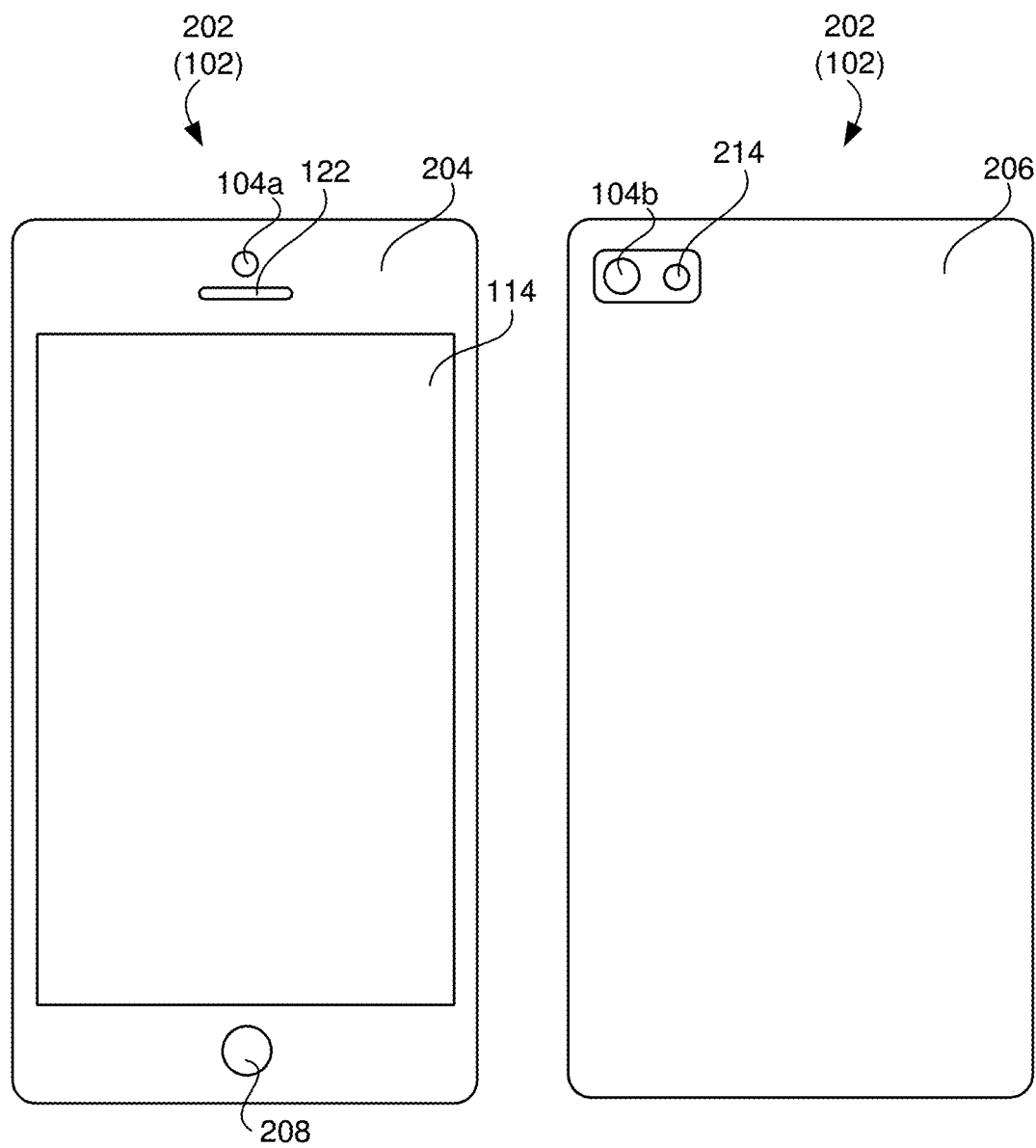
FIGS. 2A and 2B are, respectively, front and back views of an exemplary smartphone type of mobile computing device with which embodiments of the present technology can be used.

FIGS. 2A and 2B are, respectively, front and back views of an exemplary smartphone 202 type of mobile computing device 102 with which embodiments of the present technology can be used. Referring to FIG. 2A, a front 204 of the smartphone 202 is shown as including a touchscreen display 114, a button 210, a speaker 122 and a front-facing camera 104a. Referring to FIG. 2B, a back 206 of the smartphone 202 is shown as including a rear-facing camera 104b and a camera flash 214. The smartphone 202, and more generally the mobile computing device 102, can include additional buttons on the front, back and/or sides, e.g., for powering the device on and off, volume control and/or the like. In FIG. 2A the front-facing camera 104a is shown as being centered relative the sides of the smartphone 202. However, depending upon the smartphone 202, and more generally the mobile computing device 102, that is not always the case. In FIG. 2B the rear-facing camera 104b is shown as being closer to one side of the smartphone than the other, and thus, being offset relative to the sides of the smartphone 202. However, depending upon the smartphone 202, and more generally the mobile computing device 102, that is not always the case. The smartphone 202 in FIGS. 2A and 2B is arranged in what is referring to as a "portrait" position, where the height is greater than the width. If the smartphone 202 where turned sideways by 90 degrees then the smartphone 202 would be arranged in what is referred to as a "landscape" position, where the width is greater than the height.

Figure 3:
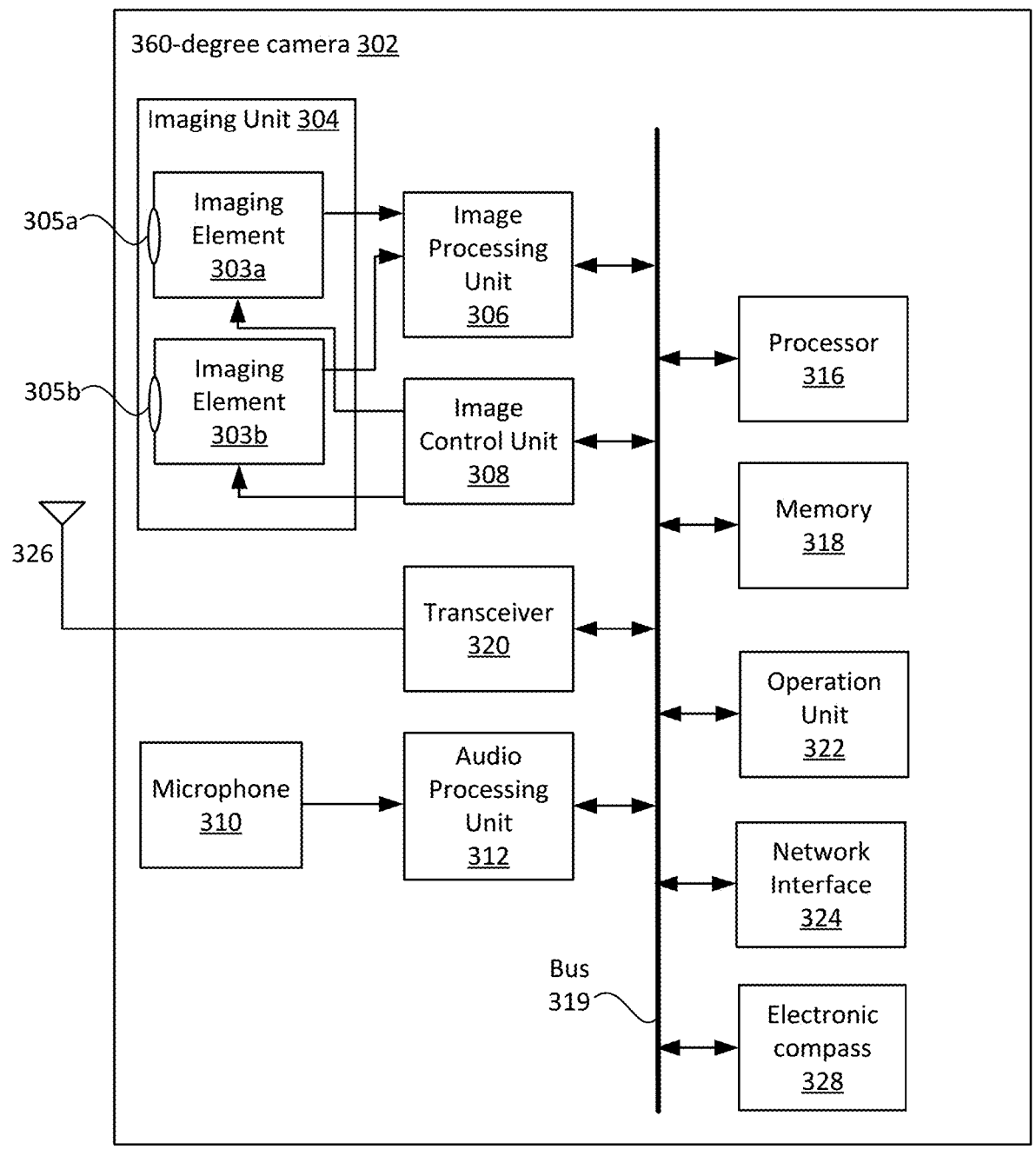
FIG. 3 illustrates exemplary components of a 360-degree camera with which embodiments of the present technology can be used.

An exemplary block diagram of a 360-degree camera 302 is illustrated in FIG. 3. A description is given hereinafter of an example in which the 360-degree camera 302 is a full spherical (omnidirectional) camera that uses two imaging elements. However, the 360-degree camera 302 may include three or more imaging elements. In addition, the 360-degree camera 302 is not necessarily omnidirectional. The 360-degree camera 302 can be, e.g., the Ricoh™ Theta V™ 4k 360-degree Spherical Camera, or any one of numerous other 360-degree cameras available from companies such as, but not limited to, Ricoh™, Samsung™, LG Electronics™, Garmin™, Kodak™, Inst360™, Sony™, etc.

As illustrated in FIG. 3, the 360-degree camera 302 includes an imaging unit 304, an image processing unit 306, an imaging control unit 308, a microphone 310, an audio processing unit 312, a processor 316, memory 318, a transceiver 320, an antenna 326, an operation unit 322, a network interface 324, and an electronic compass 328. The 360-degree camera 302 is an example of a type of digital camera, because is captures and stores images in digital memory.

The processor 316 can be used to control the various other elements of the 360-degree camera 302, e.g., under control of software and/or firmware stored in the memory 318. It is also possible that there are multiple processors 316, e.g., a central processing unit (CPU) and a graphics processing unit (GPU).

The electronic compass 328 can include, e.g., an accelerometer, a magnetometer, and/or a gyroscope, examples of which were discussed above with reference to FIG. 1, but are not limited thereto. The electronic compass 328 can determine an orientation and a tilt (roll angle) of the 360-degree camera 302 from the Earth's magnetism to output orientation and tilt information. This orientation and tilt information can be related information (metadata) described in compliance with Exchangeable image format (Exif). Further, the orientation and tilt information can be used for image processing such as image correction of captured images. Further, the related information can also include a date and time when an image is captured by the 360-degree camera 302, and a size of the image data.

The imaging unit 304 includes two wide-angle lenses (so-called fish-eye lenses) 305a and 305b, each having an angle of view of equal to or greater than 180 degrees so as to form a hemispherical image. The imaging unit 304 further includes the two imaging elements 303a and 303b corresponding to the wide-angle lenses 305a and 305b respectively.

The imaging elements 303a and 305b include image sensors such as CMOS sensors or CCD sensors, which convert optical images formed by the fisheye lenses 305a and 305b respectively into electric signals to output image data. Further, the imaging elements 303a and 303b can each include a timing generation circuit, which generates horizontal or vertical synchronization signals, pixel clocks and the like for the image sensor. Furthermore, the imaging elements 303a and 303b can each include a group of registers, in which various commands, parameters and the like for operations of an imaging element are set.

Each of the imaging elements 303a and 303b of the imaging unit 304 is connected to the image processing unit 306 via a parallel interface bus. In addition, each of the imaging elements 303a and 303b of the imaging unit 304 is connected to the imaging control unit 308 via a serial interface bus such as an I2C bus. The image processing unit 306 and the imaging control unit 308 are each connected to the processor 316 via a bus 319. Furthermore, the memory 318, the transceiver 320, the operation unit 322, the network interface 324, and the electronic compass 338 are also connected to the bus 319.

The image processing unit 306 acquires image data from each of the imaging elements 303a and 303b via the parallel interface bus. The image processing unit 306 further performs predetermined processing on each of the acquired image data, and combines these image data. For example, data of a "Mercator image" as illustrated, e.g., in FIGS. 5A, 5B and 5C, can be generated.

The imaging control unit 308 functions as a master device while the imaging elements 303a and 303b each functions as a slave device. The imaging control unit 308 sets commands and the like in the group of registers of the imaging elements 303a and 303b via a bus. The imaging control unit 308 receives commands from the processor 316. Further, the imaging control unit 308 acquires status data to be set in the group of registers of the imaging elements 303a and 303b using a bus. The imaging control unit 308 sends the acquired status data to the processor 316.

The imaging control unit 308 can instruct the imaging elements 303a and 303b to output the image data in response to a shutter button of the operation unit 322 being pressed, or in response to control signals received from another device, such as a smartphone type of mobile computing device (e.g., 102, or 202), but is not limited thereto.

The 360-degree camera 302 may display a preview image on a display. Furthermore, the imaging control unit 308 operates in cooperation with the processor 316 to synchronize times when the imaging elements 303a and 303b output the image data. The 360-degree camera 302 may include a display unit, such as a display.

The microphone 310 converts sound to audio data (signal). The audio processing unit 312 acquires the audio data from the microphone 310 via an interface bus and performs predetermined processing on the audio data.

The processor 316 controls an entire operation of the 360-degree camera 302. Further, the processor 316 executes processes performed by the 360-degree camera 302. The memory 318 can include, e.g., read only memory (ROM), a static random access memory (SRAM), and/or dynamic random access memory (DRAM). ROM can store various programs to enable the processor 316 to execute processes. SRAM and DRAM can operate as work memory to store programs loaded from ROM for execution by the processor 316 or data in current processing. More specifically, DRAM can store image data currently processed by the image processing unit 306 and data of a Mercator image on which processing has been performed.

The operation unit 322 can include various operation keys, a power switch, the shutter button, and a touch panel having functions of both displaying information and receiving input from a user, which may be used in combination. A user can operate the operation keys, etc. to input various photographing modes or photographing conditions to the 360-degree camera.

The network interface 324 collectively refers to an interface circuit such as a USB interface that allows the 360-degree camera 302 to communicate data with an external media such as an SD card or an external device. The network interface 324 connects the 360-degree camera to an external device, etc., though either wired or wireless communication. For an example, data of a Mercator image, which is stored in DRAM, can be stored in an external media via the network interface 324 or transmitted to an external apparatus such as a smartphone via the network interface 324.

The transceiver 320 can communicate with an external device via the antenna 326 of the 360-degree camera by Wi-Fi, or by near distance wireless communication such as Near Field Communication (NFC), or Bluetooth, but is not limited thereto. Such communications can be used by the 360-degree camera 302 to transmit the data (e.g., of a Mercator image) to an external device using the transceiver 320. Such an external device can be, e.g., a smartphone type mobile computing device (e.g., 102, 202), but is not limited thereto.

Figure 4:
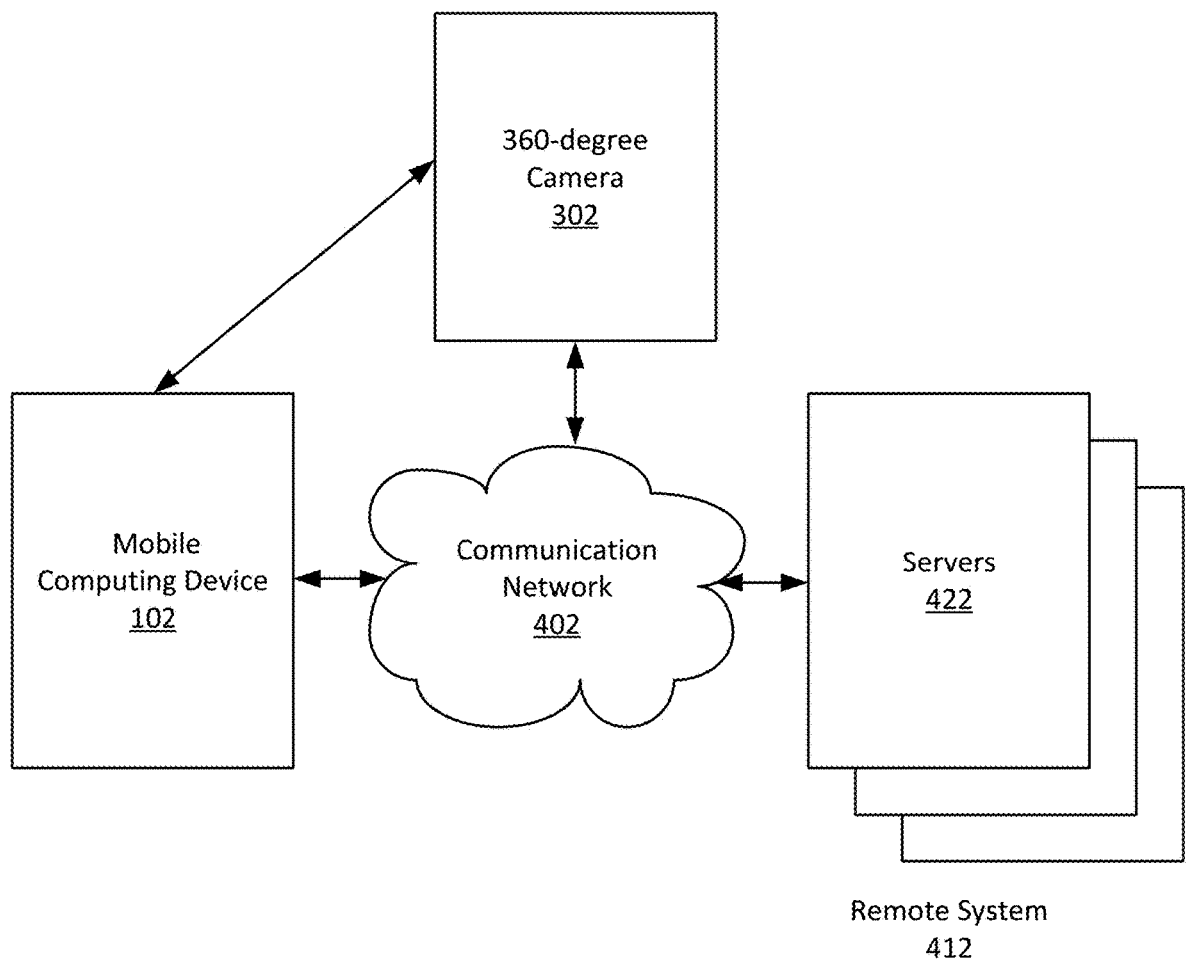
FIG. 4 is used to illustrate that a smartphone type of mobile computing device and a camera can communicate with one another, and that the smartphone type of mobile computing device can use a communication network to upload data to, and download data from, a remote system that includes one or more servers.

FIG. 4 is used to illustrate that the mobile computing device 102 (such as the smartphone 202), and a 360-degree camera 302, can use a communication network 402 to upload data to, and download data from, a remote system 412 that includes one or more servers 422. Preferably, the mobile computing device 102 and the 360-degree camera 302 can achieve such uploading and downloading wirelessly. Various communication protocols may be used to facilitate communication between the various components shown in FIG. 4. These communication protocols may include, for example, TCP/IP, HTTP protocols, Wi-Fi protocols, wireless application protocol (WAP), vendor-specific protocols, customized protocols, but are not limited thereto. While in one embodiment, communication network 402 is the Internet, in other embodiments, communication network 402 may be any suitable communication network including a local area network (LAN), a wide area network (WAN), a wireless network, an intranet, a private network, a public network, a switched network, and combinations of these, and the like. It is also possible that the mobile computing device 102 (such as the smartphone 202) and the 360-degree camera 302 communicate directly with one another, without requiring a communication network.

The distributed computer network shown in FIG. 4 is merely illustrative of a computing environment in which embodiments the present technology can be implemented, but is not intended to limit the scope of the embodiments described herein. One of ordinary skill in the art would recognize other variations, modifications, and alternatives. For example, the various servers 422 may be distributed. In other words, the remote system 412 can be a distributed system. Further, the servers can include or have access to databases and/or other types of data storage components, each of which can be considered part of the remote system 412. In accordance with certain embodiments, the mobile computing device 102 can upload data to the remote system 412 so that the remote system can generate 3D models based on the uploaded data, and the remote system 412 can download data to the mobile computing device 102 so that the mobile computing device 102 can display 3D models to a user of the mobile computing device.

Figure 5A:
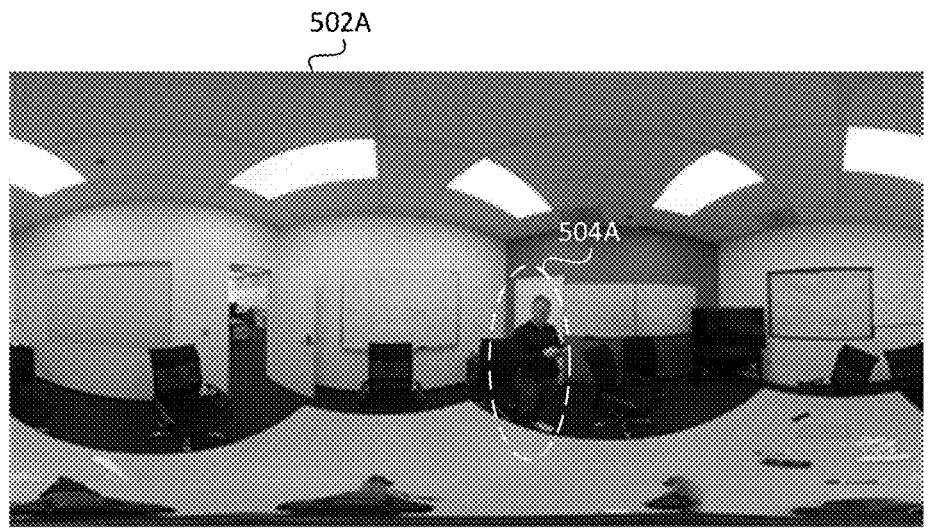
FIG. 5A shows an image of a room while a person is located at a first location.

FIG. 5A shows an exemplary image 502A captured using a 360-degree camera, such as the 360-degree camera 302 described above with reference to FIG. 3. Such an image can be used, e.g., to generate a schematic, blueprint or other graphical representation of the room captured in the image 502A. However, because a portion 503A of the image 502A includes the person that is controlling the 360-degree camera (or some other person), a portion of the room is blocked by the person. More generally, a portion 504A of the scene shown in the image 502A is blocked by the person. Certain embodiments of the present invention, initially described with reference to the high level flow diagram of FIG. 6, can be used to essentially remove a person from an image, or more specifically, to generate an image that is devoid of a person. While such embodiments are especially useful with a 360-degree camera, such embodiments are also useful with cameras having other FOVs, such as a FOV that is 120 degrees or 180 degrees, but not limited thereto.

Figure 5B:
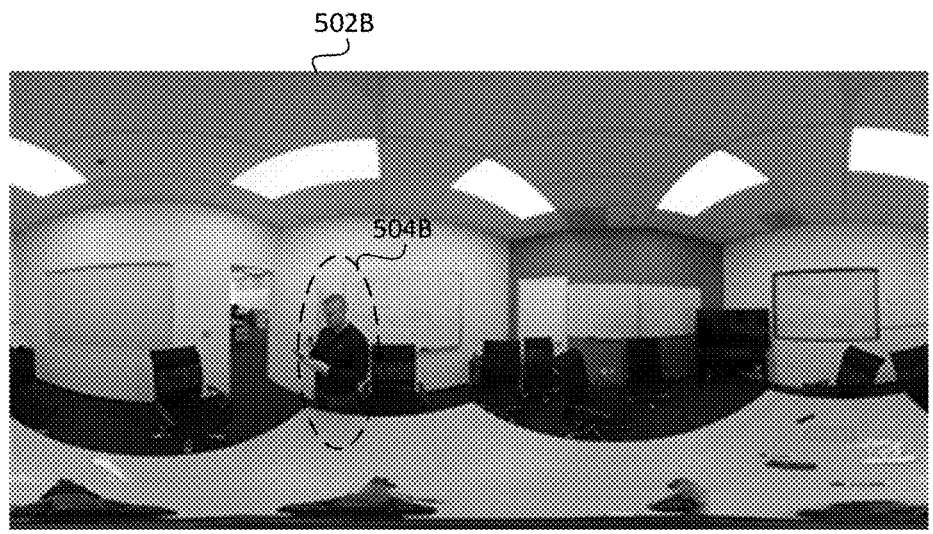
FIG. 5B shown an image of the room while the person is located at a second location.
Figure 6:
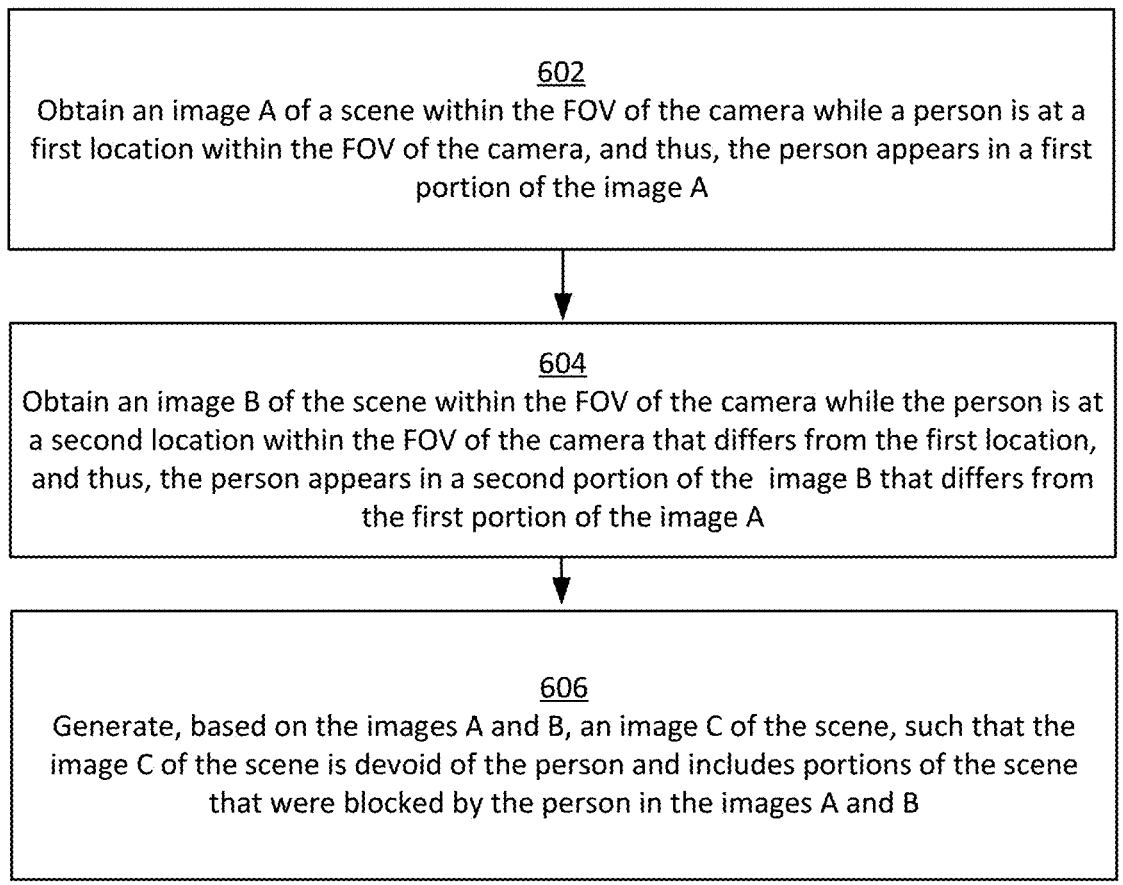
FIG. 6 is a high level flow diagram that is used to summarize methods according to certain embodiments of the of the present technology that can be used to generate an image of a region (e.g., room) that is devoid of a person based on two images of the region that include the person located at two different locations.

Referring to FIG. 6, step 602 involves obtaining a first image of a scene within the FOV of a camera while a person is at a first location within the FOV of the camera, and thus, the person appears in a first portion of the first image. The first image is also referred to herein as image A, or as the first image (A). The image 502A in FIG. 5A illustrates an example of the first image (A) Step 604 involves obtaining a second image of the scene within the FOV of the camera while the person is at a second location (within the FOV of the camera) that differs from the first location, and thus, the person appears in a second portion of the second image that differs from the first portion of the first image. The second image is also referred to herein as image B, or as the second image (B). The image 502B in FIG. 5B illustrates an example of the second image (B). Referring again to FIG. 6, a visual and/or audio instruction can be provided to the person to tell them to move before the second image is capture, wherein the capturing of the second image (B) can be performed under manual control by the person, or automatically by an application running on a mobile computing device, or the like. The person should move far enough such that when the second image (B) of the scene is taken, the person is no longer blocking the portion of the scene that they were blocking in the first image (A). Accordingly, the instruction may state that the person should move at least a specified distance (e.g., 5 feet, or the like). The capturing of the second image (B) by the camera (e.g., a 360-degree camera) can be triggered in response to the person pressing a certain button on their smartphone type mobile computing device, after the person has moved at least the specified distance relative to where they were when the first image (A) was captured. Alternatively, an application which implements this technology, which is running on the smartphone type mobile computing device, can automatically detect when the person has moved a sufficient distance and can trigger the capturing of the second image. In still another alternative, triggering capture of the second image can be based on a timer, e.g., such that the second image (B) is captured a specified time (e.g., 30 seconds, 1 minute, 90 seconds, or 2 minutes) after the first image (A) was captured. Other variations are also possible and within the scope of the embodiments described herein. Further, it is noted that other types of mobile computing devices, such as a tablet computing device, can be used in place of a smartphone type mobile computing device.

Figure 5C:
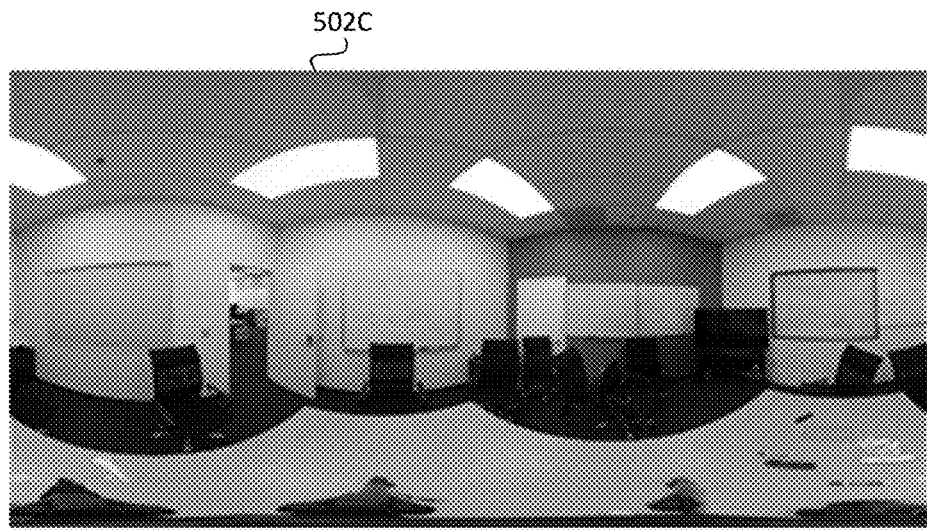
FIG. 5C shows an image of the room, generated based on the images of FIGS. 5A and 5B, that is devoid of the person shown in the images of FIGS. 5A and 5B.

Still referring to FIG. 6, step 606 involves generating, based on the images A and B, a third image of the scene, such that the image third of the scene is devoid of the person and includes portions of the scene that were blocked by the person in the images A and B. The third image is also referred to herein as image C, or as the third image (C). In accordance with an embodiment, step 606 is performed using one or more processors. The image 502C in FIG. 5C illustrates an example of the third image (C).

Figure 7:
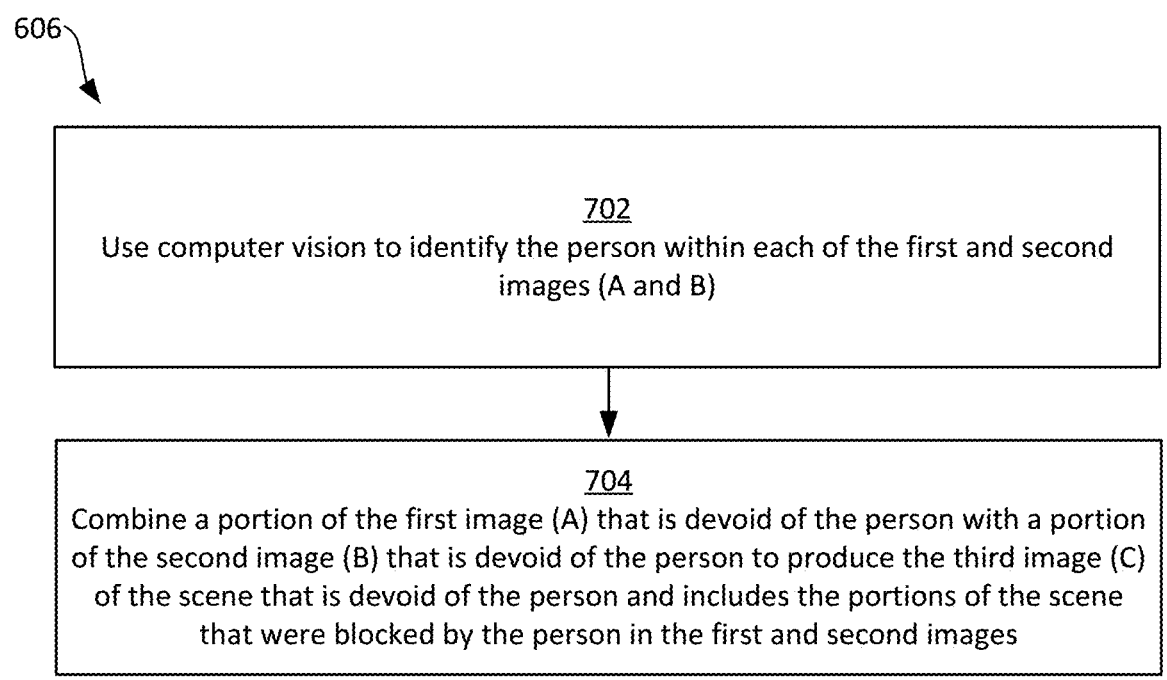
FIG. 7 is a high level diagram that is used to describe additional details of one of the steps introduced in FIG. 6, according to certain embodiments of the present technology.

An exemplary implementation of step 606 is described with reference to the flow diagram of FIG. 7, which includes steps 702 and 704. In other words, the third image (C) that is generated at step 606 can be generating by performing sub-steps 702 and 704. Referring to FIG. 7, step 702 involves using computer vision to identify the person within each of the first and second images (A and B). There exist well known computer vision techniques for recognizing humans within images, and thus, such techniques need not be described herein. Computer vision techniques that detect differences between multiple images can additional or alternatively be used. Still referring to FIG. 7, step 704 involves combining a portion of the first image (A) that is devoid of the person with a portion of the second image (B) that is devoid of the person to produce the third image (C) of the scene that is devoid of the person and includes the portions of the scene that were blocked by the person in the first and second images (A and B).

Figure 8A:
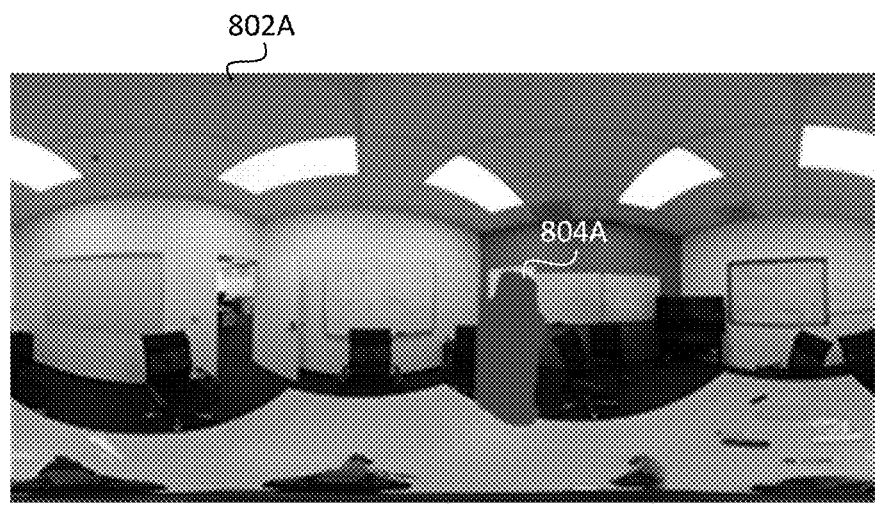
FIG. 8A shows a first image of a room after a person in the image has been identified and removed from the first image.
Figure 8B:
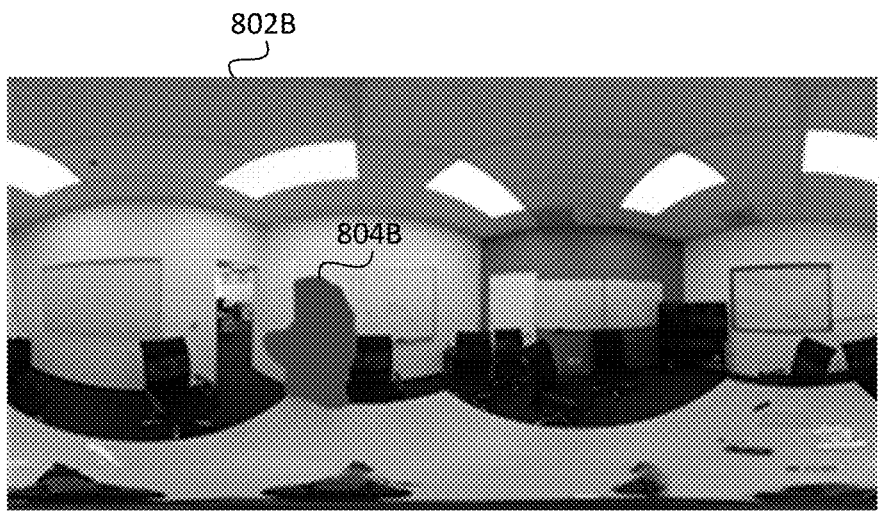
FIG. 8B shows a second image of a room after the person in the image has been identified and removed from the second image.
Figure 8C:
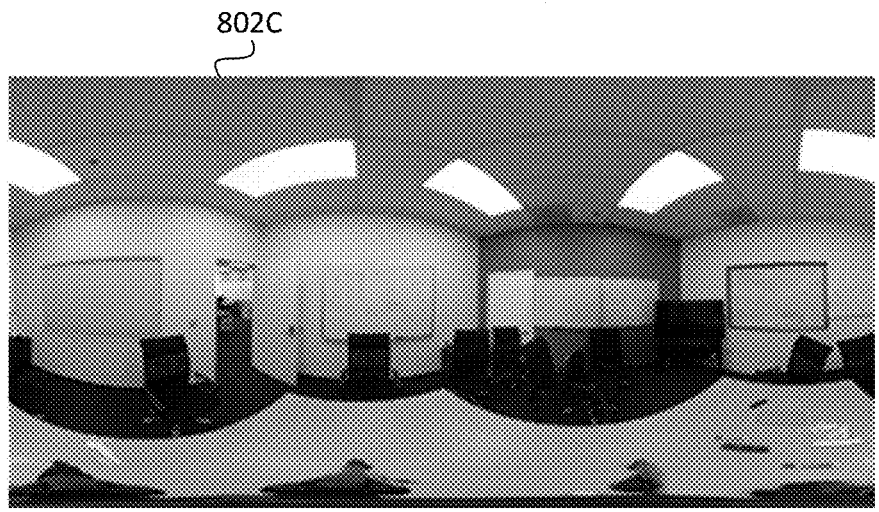
FIG. 8C shows a third image of the room generated based on the first and second images, wherein the person is not present in the third image of the room.

FIG. 8A shows an example of the image A, after the person in the image has been identified within the image and the area around the person has been expanded, i.e., dilated. The resulting image is labeled 802A. The blob 804A shown in the image 802A is where the person was located, and thus, a portion of the scene where the blob is located is missing. FIG. 8B shows an example of the image B, after the person in the image has been identified within the image and the area around the person has been expanded, i.e., dilated. The resulting image is labeled 802B. The blob 804B shown in the image 802A is where the person was located, and thus, a portion of the scene where the blob is located is missing. The image 802C shown in FIG. 8C, which is the same as the image 502C shown in FIG. 5C, is an example of the combined image devoid of the person.

Figure 9:
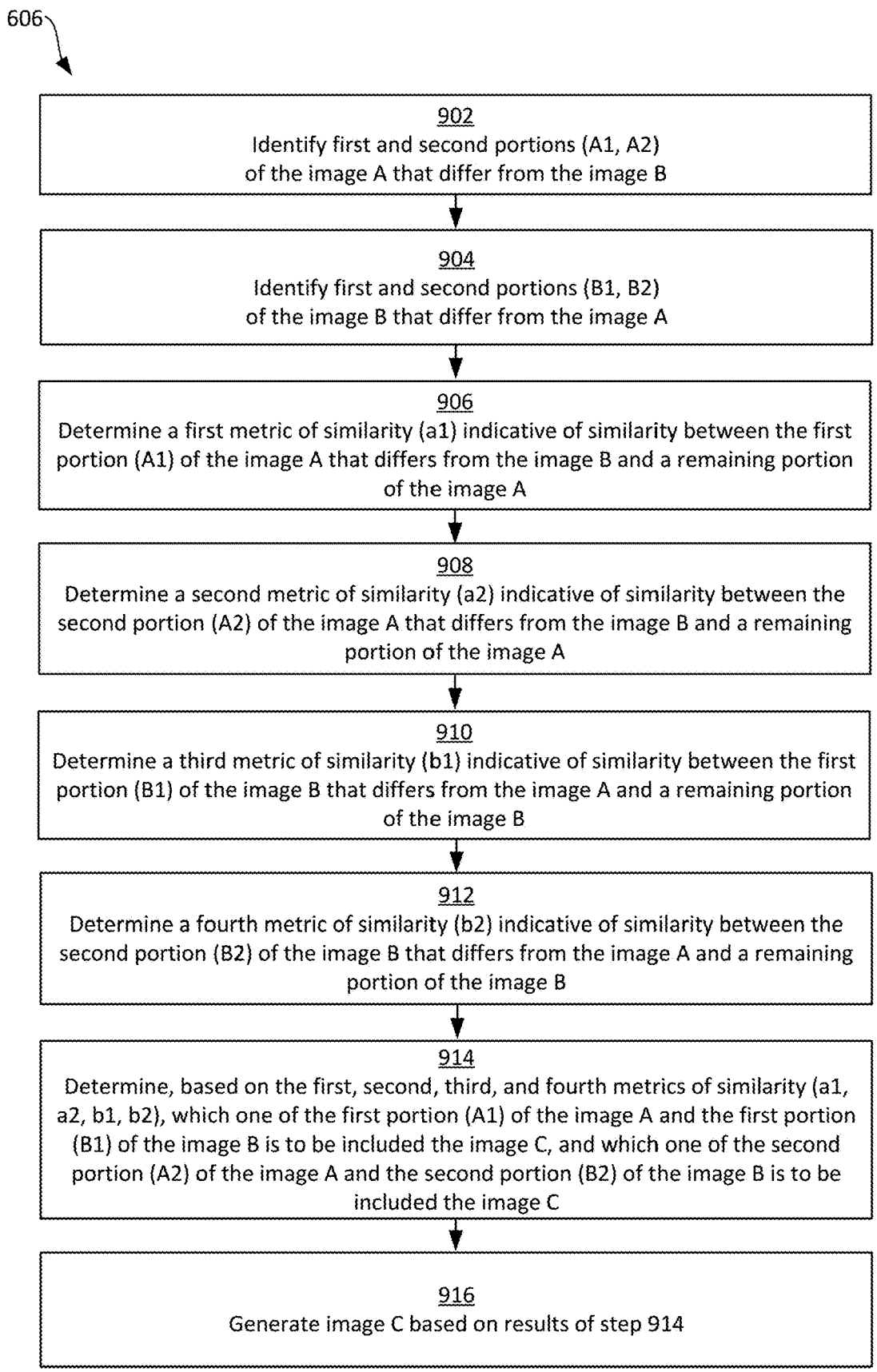
FIG. 9 is a high level diagram that is used to describe additional details of one of the steps introduced in FIG. 6, according to certain embodiments of the present technology.
Figure 10A:
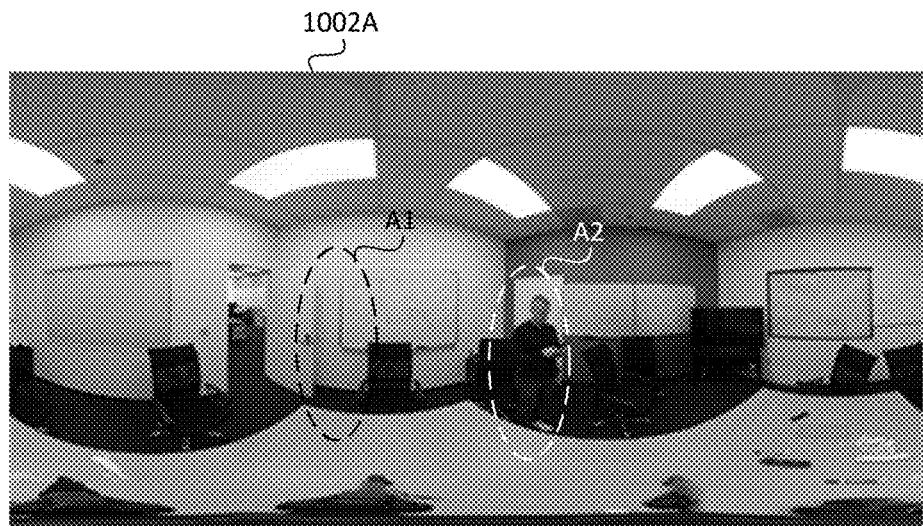
FIGS. 10A and 10B show first and second images of a same region (e.g., room) with differences between the first and second images identified.
Figure 10B:
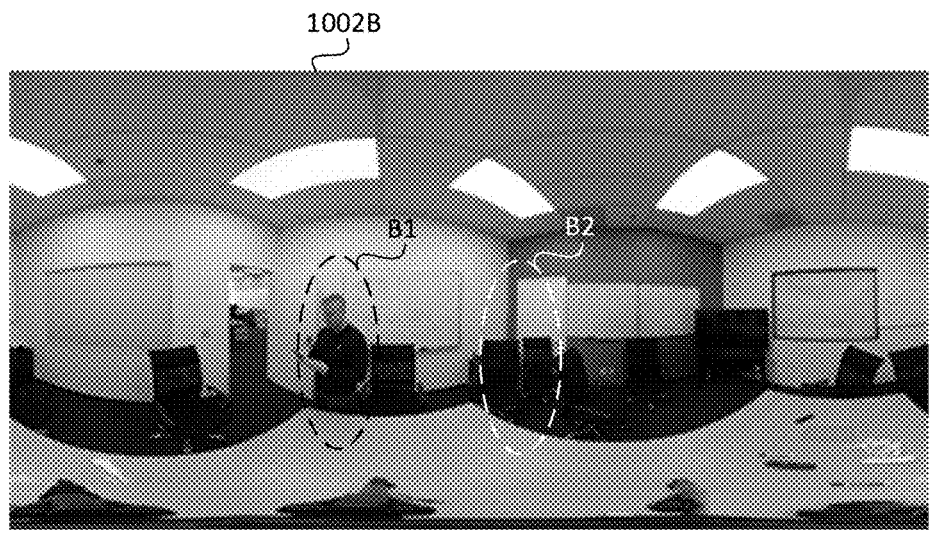
Figure 10C:
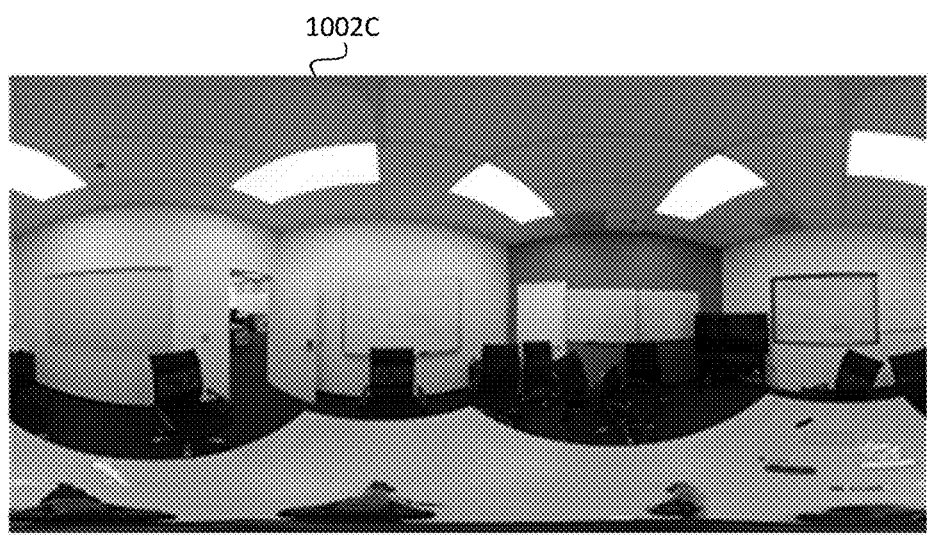
FIG. 10C shows a third image that is devoid of the person (shown in FIGS. 10A and 10B) and that can be generated using embodiments of the present technology described with reference to FIG. 9.

Another exemplary implementation of step 606 is described with reference to the flow diagram of FIG. 9, which includes steps 902 through 916. In other words, the third image (also known as image C) that is generated at step 606 can be generating by performing sub-steps 902 through 916. The embodiment described with reference to FIG. 9 takes advantage of the assumption that when a person is located in an image, the portion of the image occupied by the person will be quite different than a remaining portion of an image (e.g., a portion of the image surrounding the person). Referring to FIG. 9, step 902 involves identifying first and second portions (A1, A2) of the first image (A) that differ from the second image (B), and step 904 involves identifying first and second portions (B1, B2) of the second image (B) that differ from the first image (A). The order of steps 902 and 904 can be reversed, or these steps can be performed at the same time. Referring to FIGS. 10A and 10B, the image 1002A is an example of the first image (A), the image 1002B is an example of the second image (B). The labels A1 and A2 in FIG. 10A are examples of first and second portions (A1, A2) of the first image (A) that differ from the second image (B). The labels B1 and B2 in FIG. 10B are examples of the first and second portions (B1, B2) of the second image (B) that differ from the first image (A).

Step 906 involves determining a first metric of similarity (a1) indicative of similarity between the first portion (A1) of the first image that differs from the second image (B) and a remaining portion of the first image (A). The remaining portion of the first image (A) referred to in step 906 can be, e.g., a portion of the first image (A) surrounding the first portion (A1), or an entirety of the first image (A) besides the first portion (A1), but is not limited thereto. Step 908 involves determining a second metric of similarity (a2) indicative of similarity between the second portion (A2) of the first image (A) that differs from the second image (B) and a remaining portion of the first image (A). The remaining portion of the first image (A) referred to in step 908 can be, e.g., a portion of the first image (A) surrounding the second portion (A2), or an entirety of the first image (A) besides the second portion (A2), but is not limited thereto. The order of steps 906 and 908 can be reversed, or these steps can be performed at the same time.

Step 910 involves determining a third metric of similarity (b1) indicative of similarity between the first portion (B1) of the second image (B) that differs from the first image (A) and a remaining portion of the second image (B). The remaining portion of the second image (B) referred to in step 910 can be, e.g., a portion of the second image (B) surrounding the first portion (B1), or an entirety of the second image (B) besides the first portion (B1), but is not limited thereto. Step 912 involves determining a fourth metric of similarity (b2) indicative of similarity between the second portion (B2) of the second image (B) that differs from the first image (A) and a remaining portion of the second image (B). The remaining portion of the second image (B) referred to in step 912 can be, e.g., a portion of the second image (B) surrounding the second portion (B2), or an entirety of the second image (B) besides the second portion (B2), but is not limited thereto. The order of steps 910 and 912 can be reversed, or these steps can be performed at the same time. It would also be possible that steps 910 and 912 be performed before steps 906 and 908, or that all of these steps be performed at the same time. Other variations are also possible.

Still referring to FIG. 9, step 914 involves determining, based on the first, second, third, and fourth metrics of similarity (a1, a2, b1, b2), which one of the first portion (A1) of the first image (A) and the first portion (B1) of the second image (B) is to be included the third image (C), and which one of the second portion (A2) of the first image (A) and the second portion (B2) of the second image (B) is to be included the third image (C). Finally, at step 916, the third image (C) is generated based on the results of step 914.

Step 914 can include comparing a sum of the first and fourth metrics (a1+b2) to a sum of the second and third metrics (a2+b3), and determining, based on results of the comparing, which one of the first portion (A1) of the first image (A) and the first portion (B1) of the second image (B) is to be included the third image (C), and which one of the second portion (A2) of the first image (A) and the second portion (B2) of the second image (B) is to be included the third image (C). In accordance with certain embodiments, for each of the first, second, third, and fourth metrics of similarity (a1, a2, b1, b2), a lower magnitude is indicative of higher similarity, and higher magnitude is indicative of a lower similarity. Step 914 can involve determining whether the sum of the first and fourth metrics (a1+b2) is less than or greater than the sum of the second and third metrics (a2+b3). In embodiments where a lower magnitude is indicative of higher similarity (and higher magnitude is indicative of a lower similarity), in response to determining that the sum of the first and fourth metrics (a1+b2) is less than the sum of the second and third metrics (a2+b3), it can be determined that the first portion (A1) of the first image (A) and the second portion (B2) of the second image (B) is to be included in the third image (C). In response to determining that the sum of the first and fourth metrics (a1+b2) is greater than the sum of the second and third metrics (a2+b3), it can be determined that the second portion (A2) of the first image (A) and the first portion (B1) of the second image (B) is to be included in the third image (C).

In accordance with other embodiments, for each of the first, second, third, and fourth metrics of similarity (a1, a2, b1, b2), a higher magnitude is indicative of higher similarity, and lower magnitude is indicative of a lower similarity. Step 914 can involve determining whether the sum of the first and fourth metrics (a1+b2) is less than or greater than the sum of the second and third metrics (a2+b3). In embodiments where a higher magnitude is indicative of higher similarity (and lower magnitude is indicative of a lower similarity), in response to determining that the sum of the first and fourth metrics (a1+b2) is greater than the sum of the second and third metrics (a2+b3), it can be determined that the first portion (A1) of the first image (A) and the second portion (B2) of the second image (B) are to be included in the third image (C). In response to determining that the sum of the first and fourth metrics (a1+b2) is less than the sum of the second and third metrics (a2+b3), it can be determined that the second portion (A2) of the first image (A) and the first portion (B1) of the second image (B) are to be included in the third image (C).

Further embodiments of the present technology, described below, enable items (e.g., that need to be repaired) to be easily and readily tagged within a schematic, blueprint or other graphical representation of a region (e.g., room) in a manner the provides good specificity, e.g., to clearly indicate which one of numerous cabinet pulls in a kitchen needs to be repaired, or to clearly indicate which one of a number of door knobs in a bedroom needs to be repaired. Such embodiments can be performed using a 360-degree camera (or some other type of camera, such as a 270-degree camera, or 180-degree camera, but not limited thereto) and a smartphone type mobile computing device (or some other type of mobile computing device) that are in communication with one another (e.g., via a wireless communication link, or the like). Such embodiments enable spatial information (e.g., spatial coordinates) to be determined for one or more items of interest within a graphical representation of a region (e.g., room) generated based on one or more images of the region captured using the 360-degree camera (or some other type of camera). Such a graphical representation of the region can be a two-dimensional representation, e.g., a 2D floor plan, or a three-dimensional representation, e.g., a 3D floor plan or 3D representation of a portion of a region (e.g., room). Such embodiments can include capturing one or more images of the region (e.g., room) using the 360-degree camera, and generating or otherwise obtaining a graphical representation of the region (e.g., room) based on the one or more images of the region (e.g., room) captured using the 360-degree camera (or other type of camera). The images captured by the 360-degree camera can be transferred to the mobile computing device (e.g., smartphone) using a Wi-Fi network, Bluetooth communication, or some other wireless or wired communication. An application installed on the mobile computing device can generate a graphical representation (e.g., 3D graphical representation) of the region, or the mobile computing device can use a communication network to transfer the image(s) of the region to a remote system (e.g., 412 in FIG. 4) that generates the graphical representation. For each item of interest, of the one or more items of interest (e.g., a broken door handle, a broken cabinet pull, and a worn out section of carpeting), the 360-degree camera can be used to capture one or more further images of the region (e.g., room) while the mobile computing device (e.g., smartphone) is placed in close proximity to the item of interest, and thus, the mobile computing device (e.g., smartphone) appears in the one or more further images. Then, for each item of interest (of the one or more items of interest), spatial information (e.g., spatial coordinates) is determined for the item of interest based on the one or more further images of the region within which the first mobile device appears. An application that implements and controls aspects of this embodiment can be installed on the mobile computing device (e.g., smartphone), which can control the 360-degree camera (or some other camera).

Figure 11:
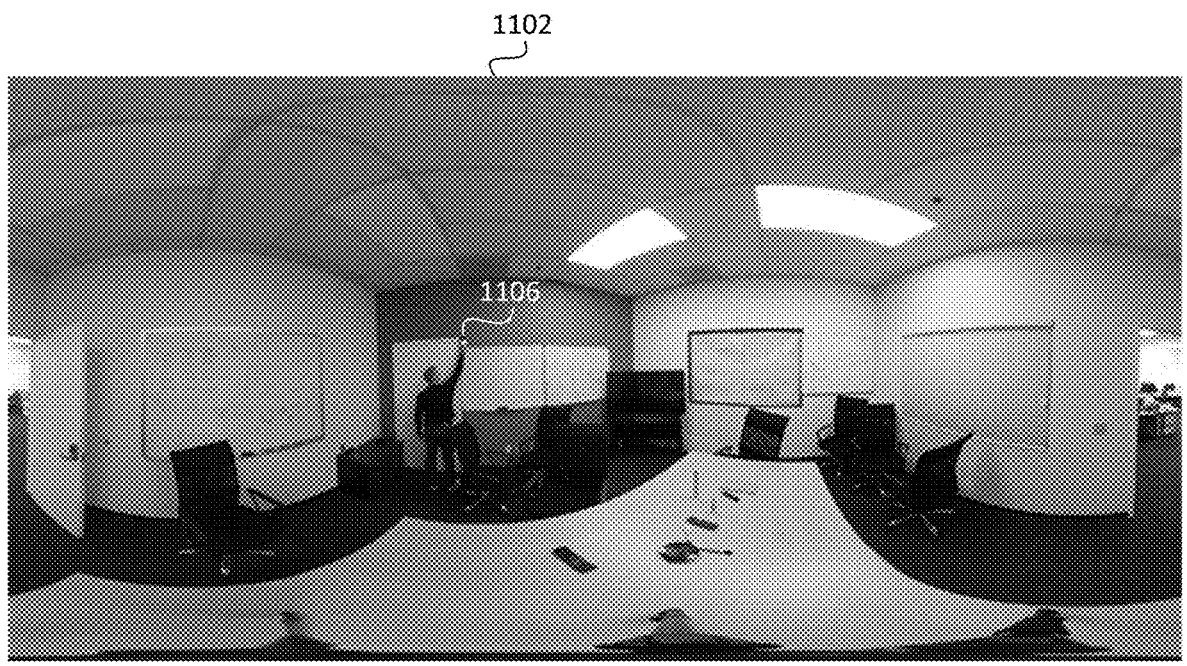
FIG. 11 shows an example of an image of a room captured by a 360-degree camera, where a smartphone is placed in close proximity to an item of interest, and thus, the smartphone appears in the captured image.

FIG. 11 shows an example of an image 1102 of a room where a smartphone 1106 is placed in close proximity to an item of interest (a portion of door trim in this example), and thus, the smartphone 1106 appears in the image 1102. To capture the location of the items of interest, the mobile computing device (e.g., smartphone) is used as a marker that can be detected in one or more image(s) captured by the 360-degree camera that captured the image(s). The image 1102 shown in FIG. 11 can be captured by a 360-degree camera (e.g., 302 in FIG. 3), which is not shown in FIG. 11, but is presumed to be placed near the center of the room shown in the image 1102. More generally, the 360-degree camera (or other camera) can be placed in a known or later to be calculated central position in the space (e.g., room) where items are to be located. The application on the mobile computing device (e.g., smartphone) is connected to the 360-degree camera (or other camera) and can read images from the 360-degree camera.

Figure 12:
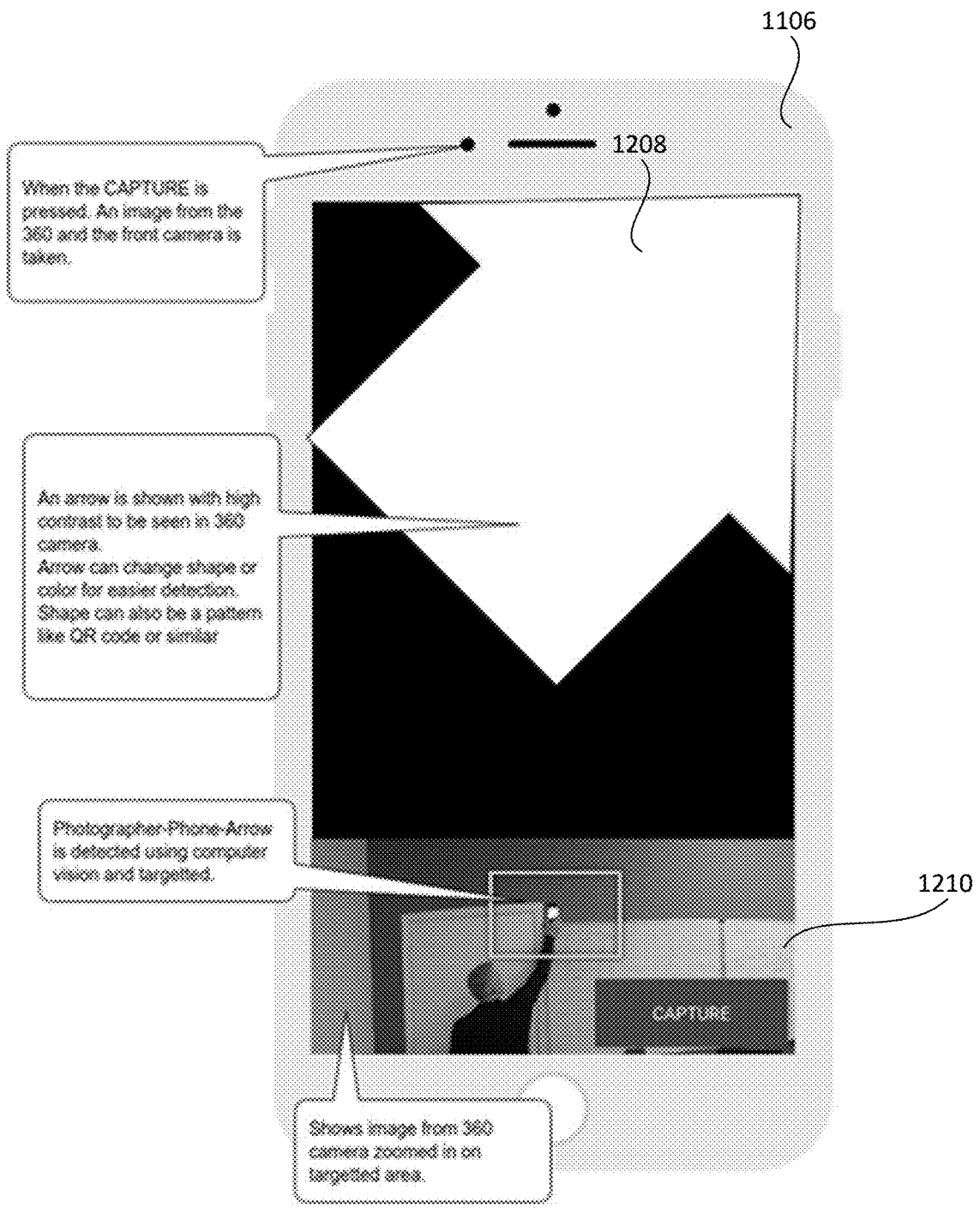
FIG. 12 shows that an application can display an arrow, or other identifiable indicator, on a display of a smartphone so that the identifiable indicator (e.g., the arrow) will be shown in an image captured by a 360-degree camera, so that the indicator can be used to generate coordinates and/or other metadata for an item of interest in close proximity to the identifiable indicator (e.g., the arrow).

Referring to FIG. 12, the application can display an arrow 1208, shape, pattern (e.g., QR code) or other identifiable indicator, potentially animated, on the display of the mobile computing device (e.g., smartphone). The identifiable indicator (e.g., arrow 1208) that can be used to detect the position in the image from the 360-degree camera on the mobile device display with high contrast. For example, in FIGS. 11 and 12, the person (also referred to as user) holds the smartphone 1106 pointing the arrow 1209 at the item of interest. The smartphone 1106 obtains the image from the 360-degree camera and detects the smartphone (and more specifically the identifiable indicator, e.g., arrow 1208) in the image. In a portion 1210 (e.g., lower portion) of the display on the smartphone 1106, the image from the 360-degree camera is shown with the detected position marked. This allows for the user to make sure the position is pointed to and detected correctly. Instead of (or in addition to) detecting the smartphone or identifiable indicator (e.g., arrow 1208) within the image captured by the 360-degree camera, and using the detected smartphone or identifiable indicator to determine the spatial coordinates for the item of interest, the arm or another body part of the person holding the smartphone can be detected within the image captured by the 360-degree camera and used to determine the spatial coordinates for the item of interest. For example, if the smartphone appears very small in the image captured by the 360-degree camera, and is thus not readily identifiable, the person's arm can instead be identified and it can be assumed that the item of interest is in close proximity to the person's arm.

The user then presses a button to capture the location. In accordance with certain embodiments, when a predetermined button is pressed on the smartphone (or tablet computing device), the 360-degree camera captures the image that includes the smartphone (or tablet computing device) and the image is saved (e.g., in the memory of the smartphone or tablet computing device) and the marked position is saved as a location. Later in post processing the location of the item of interest in the image captured by the 360-degree camera can be positioned in 3D space by intersecting a ray from the 360-degree camera center to the item of interest (or more specifically, a smartphone, identifiable indicator, or body part near the item of interest) within the 3D geometry. The post processing can be performed within the mobile computing device (e.g., smartphone), or by remote system (e.g., 412 in FIG. 4), or a combination thereof, but is not limited thereto. Example additional details of the smartphone 1106 discussed with reference to FIGS. 11 and 12 can be appreciated from the above discussion of the mobile computing device 102 and the smartphone 202 discussed above with reference to FIGS. 1, 2A, and 2B.

In accordance with certain embodiments, at the same time (or substantially the same time) that the 360-degree camera (or other camera) captures the image that includes the smartphone, in response to the predetermined button on the smartphone being pressed, a front-facing camera (e.g., 104*a* in FIG. 2A) of the smartphone also captures an image that includes the 360-degree camera (or other camera), and both of these images are saved (e.g., in the memory of the smartphone) and the marked position is saved as the location. In accordance with certain embodiments, this image from the front-facing camera is used to increase the reliability and accuracy of the determined spatial information, e.g., by matching the image from the smartphone against the image obtained from the 360-degree camera (or other camera) and calculating a relative pose using computer vision. Such matching can be achieved by detecting features in the two images (one captured by the smartphone, the other captured by 360-degree camera or other camera), matching the detected features, and then using a robust method to calculate the relative pose between the different cameras. Such a robust method could be 5-point relative pose solver in a RANSAC (random sample consensus scheme) loop, but is not limited thereto.

In accordance with certain embodiments, computer vision is used to find the location of the person in the image captured by the 360-degree camera to get a rough spatial location. The images from the smartphone and the 360-degree camera can collectively be used to figure out where the smartphone (or tablet computing device) was pointed and the spatial location.

The items of interest can be, e.g., included in an inspection list or punch list of items that need to be logged and/or repaired. For example, assume a person is renting a rental unit, and that during inspection, the unit gets imaged using a 360-degree camera. Using embodiments of the technology, spatial coordinates of the inspection items or punch list items can be generated to reduce any ambiguities as to what items are damaged and/or need to be repaired. For an example, a floor plan can be generated from one or more images captured by the 360-degree camera. The location of the 360-degree camera that captures the images used to generate the 3D representation (e.g., model) can be assumed to be 0, 0 (in just x and y coordinates), or can be 0, 0, 0 (if also including a z coordinate), which is presumably at or near a center of a room. From an electronic compass, or the like, directions, such as North, East, South, and West can be determined. Images can be annotated with labels or other metadata, to specify what rooms, or the like, they correspond to, such as a kitchen, bathroom, living room, bedroom, etc.

Figure 14:
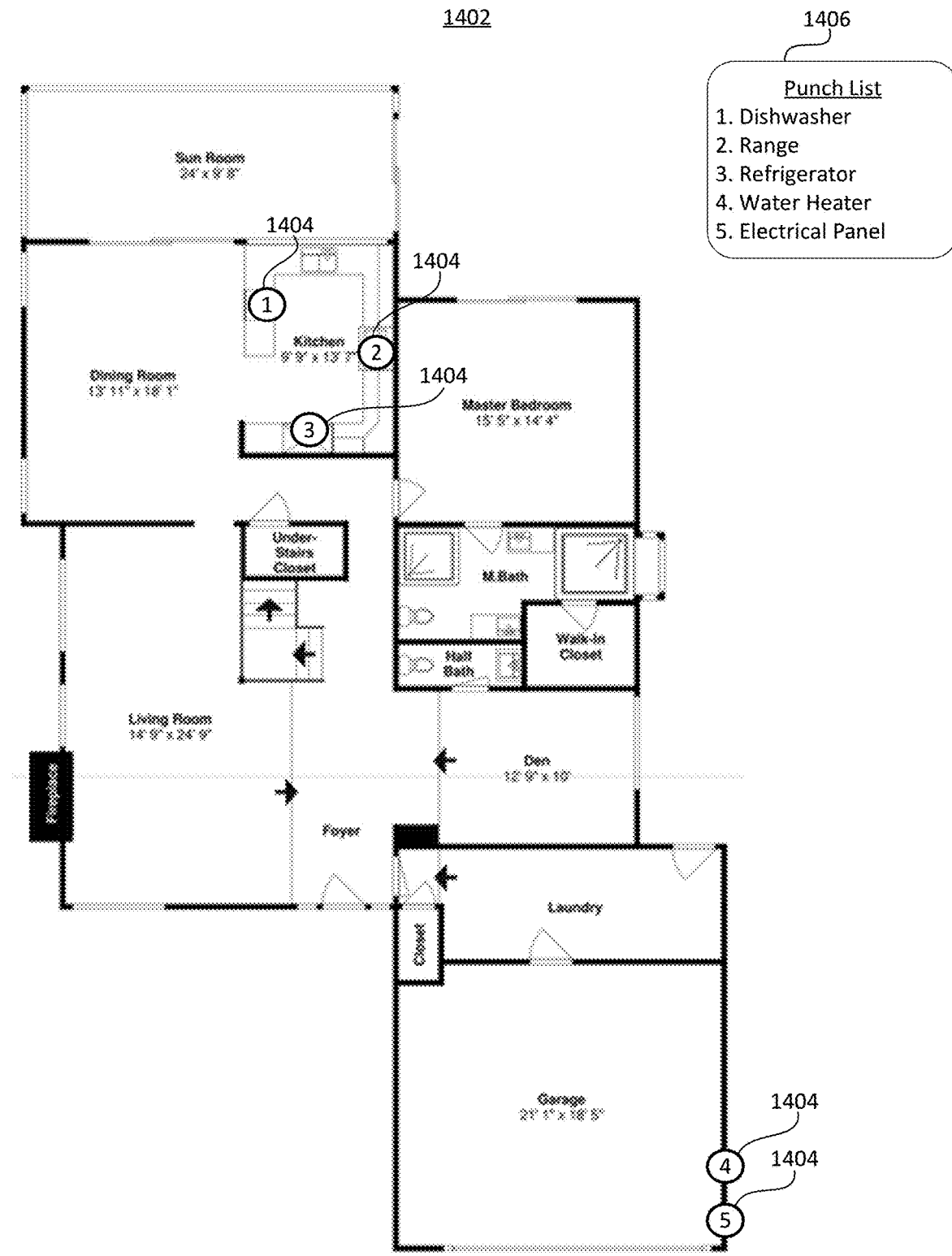
FIG. 14 shows an example a floor plan that can be generated from one or more images captured by a 360-degree camera, wherein the floor plan is annotated to show certain items of interest in accordance with certain embodiments of the present technology.

Embodiments of the present technology can be used to add and display markers on a floor plan that indicates one or more items of interest along with notes, such as the carpet is very warn at this location. An example of a floor plan 1402 that can be generated from images captured by a 360-degree camera (or other camera) is shown in FIG. 14, wherein the floor plan 1402 is annotated with markers 1404 to show certain items of interest, in accordance with certain embodiments of the present technology. In the example shown in FIG. 14, each of the markers 1404 is numbered (1, 2, 3, 4, 5), with the numbers of the markers 1404 corresponding to one of the items of interest in the list 1406 shown in the upper right of FIG. 14.

In accordance with certain embodiments, spatial coordinate are added to items of interest. The spatial coordinates can be x and y coordinates relative to a center of a room (or more generally, a location of the 360-degree camera), and can also include a z coordinate for height. In certain embodiments, a coordinate system can be translated into GPS coordinates, e.g., if uploaded to Google Earth, or the like, which can change the spatial coordinates to values of longitude, latitude, and altitude. In certain embodiments, the 0, 0 coordinates can be a corner of a room (or other region) rather than the center, depending on what is chosen by a user. A coordinate system can be adjusted or translated to another coordinate system, by adding or subtracting as appropriate. The just described embodiments can be used together with one of the above described embodiments that removes the photographer or other person from an image. For example, a 360-degree camera can be placed in the center of a room, and two images of the room can be captured, were the person is at different locations in the two images. The two captured images of the room can be processed to get rid of the photographer. Items of interest can then be identified and added to a 3D graphical representation of the room that is generated based on the image(s) of the room. Assume, for example, that a person wants to indicate that a specific door handle on a specific kitchen door needs to be fixed. With an application running on a smartphone or other mobile computing device, the person can indicate that they want to add an inspection item that indicates that this door handle needs to be fixed, and then the person can hold up the smartphone so that the screen of the smartphone can be seen by the 360-degree camera. In accordance with certain embodiments, the person can then press a button on the app/smartphone that causes at least two (and possibly three) things to be performed substantially simultaneously, including: 1) optionally capture an image of the handle using the rear-facing camera of the smartphone; 2) display a recognizable indicator (e.g., the arrow 1208) on the display of the smartphone; and 3) capture an image of the room (or at least a portion thereof) using the 360-degree camera with the recognizable indicator (e.g., the arrow 1208) on the display of the smartphone and thus included in the captured image. This can result in an image of the broken handle being captured by the smartphone, and also an image of room (or at least a portion thereof) being captured by the 360-degree camera with the recognizable indicator included in captured image of room. In alternative embodiments, these two things need not occur at the same time. This technology enables inspection items and/or other types of items of interest to be automatically identified and spatial coordinates thereof generated using an application. The captured image of the item of interest captured using the rear-facing camera of the smartphone can be used solely for documentation, or can be used to increase the accuracy of the spatial coordinates of the item of interest, e.g., by matching/finding the image captured by the rear-facing camera of the smartphone in the image of the room captured by the 360-degree camera.

Such embodiments of the present technology can be used for other purposes besides marking items that need to be repaired and generating a list of such items. For example, such embodiments can be used to add smart tags within a graphical representation of a region (e.g., room), such that when a smart tag is selected by a user it provides additional information to the user. For example, smart tags can mark various items within a graphical representation of a house that is for sale, so that a potential buyer and/or appraiser can learn more information about such items, such as, but not limited to, appliances, countertops, and/or the like.

In certain embodiments, a house or rental unit can be imaged and smart tags can be added to a 3D graphical representation of the house or rental unit to specify items that should be repaired. Then, after the items are supposedly repaired, the house or rental unit can again be imaged and the new 3D graphical representation of the house or rental unit can be overlaid on the original representation to check to see if items that were supposed to be repaired were actually repaired.

Figure 13:
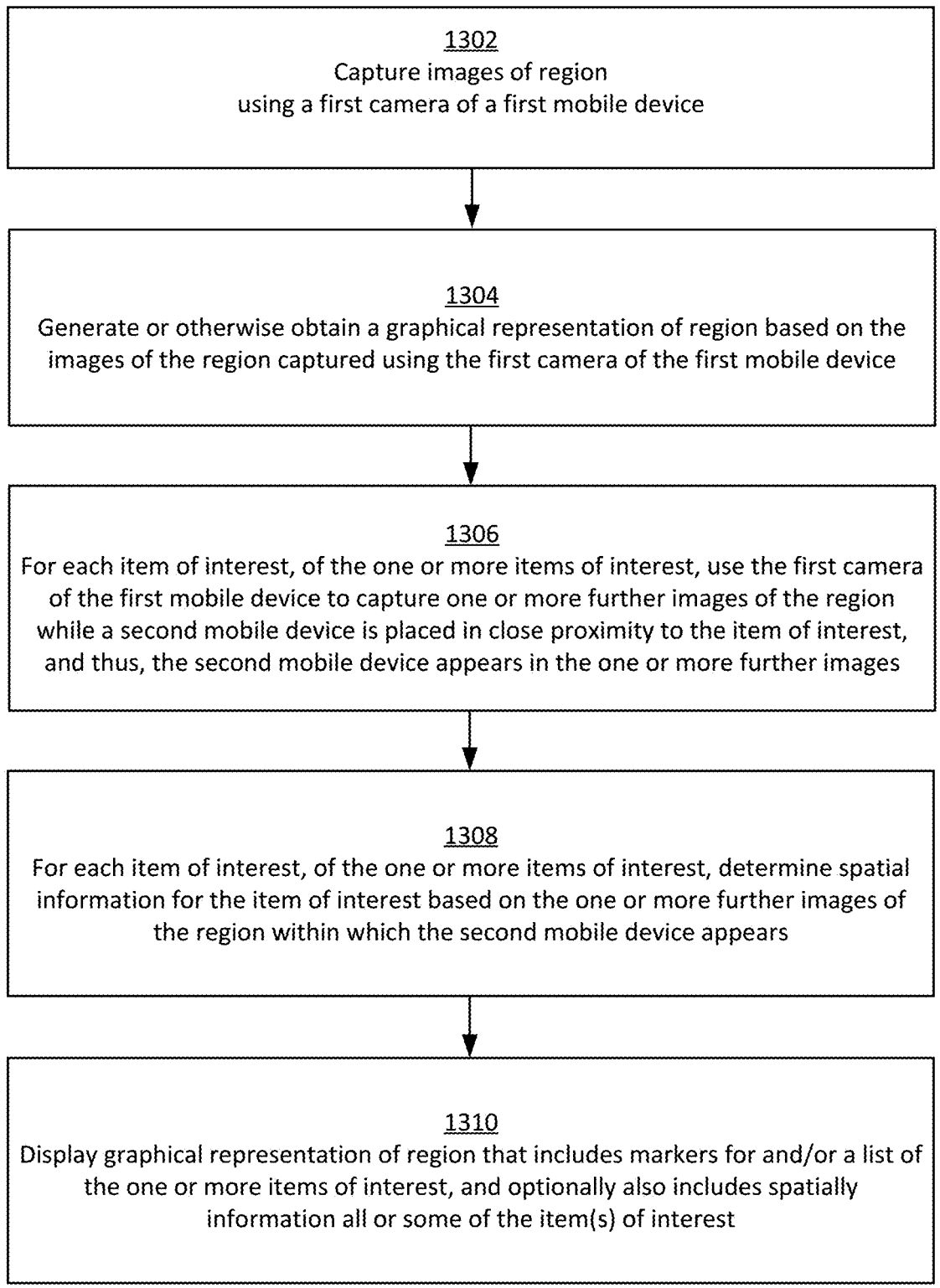
FIG. 13 is a high level flow diagram that is used to summarize methods according to certain embodiments of the of the present technology that can be used to determine spatial information for one or more items of interest within a graphical representation of a region generated based on one or more images of the region captured using a camera of a mobile device.

FIG. 13 is a high level flow diagram that is used to summarize embodiments of the present technology introduced above with reference to FIGS. 11 and 12. More specifically, FIG. 13 is used to summarize methods according to certain embodiments of the of the present technology that can be used to determine spatial information for one or more items of interest within a graphical representation of a region generated based on one or more images of the region captured using a camera of a mobile device. Referring to FIG. 13, step 1302 involves capturing one or more images of a region (e.g., room) using a first camera of a first mobile device. The images capture at step 1302 can be captured, e.g., by a 306-degree camera, but are not limited thereto.

Step 1304 involves generating or otherwise obtaining a graphical representation of the region (e.g., room) based on the one or more images of the region captured using the first camera of the first mobile device. Where the graphical representation of the region is three-dimensional, the three-dimensional graphical representation of the region can be generated using structure from motion (SfM) techniques, or any other known or futured developed techniques that can be used to generate a graphical representation of a region based on images of the region. In certain embodiments, the graphical representation of the region can be generated by a second mobile device, e.g., a smartphone or tablet computing device, that receives the images captured at step 1302 via a Wi-Fi network, Bluetooth communication, or some other wireless or wired communication. An application installed on the second mobile device, e.g., a smartphone or tablet computing device, can generate the graphical representation of the region. Alternatively, the second mobile device (or the first mobile device) can use a communication network to transfer the image(s) of the region to a remote system (e.g., 412 in FIG. 4) that generates the graphical representation, which may or may not be three-dimensional, depending upon the implementation.

Figure 15:
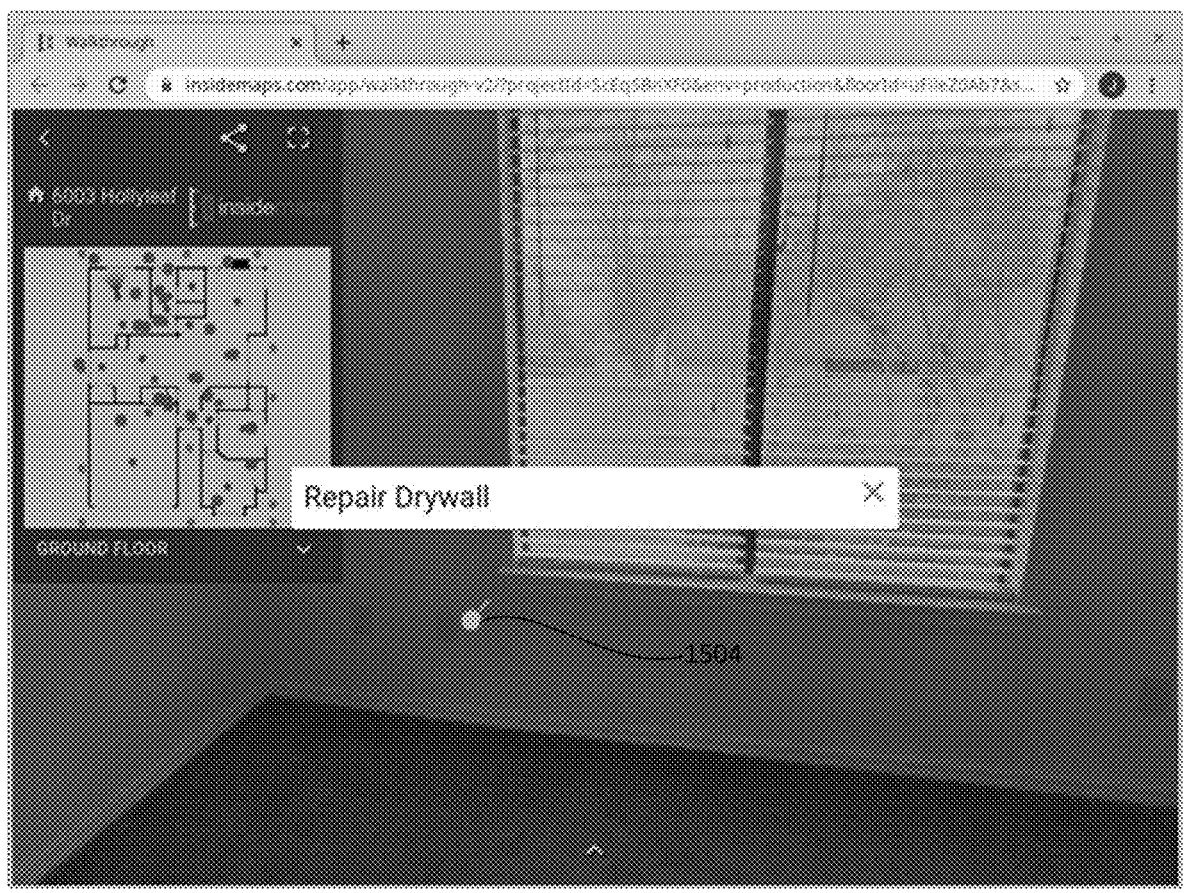
FIG. 15 shows an example of a three-dimensional graphical representation of a region that includes a marker pin specifying where a repair is needed.

Still referring to FIG. 13, step 1306 involves for each item of interest, of the one or more items of interest, using the first camera of the first mobile device (e.g., a 360-degree camera) to capture one or more further images of the region while the second mobile device (e.g., a smartphone or tablet computing device) is placed in close proximity to the item of interest, and thus, the second mobile device appears in the one or more further images. Further, step 1308 involves, for each item of interest, of the one or more items of interest, determining spatial information (e.g., coordinate) for the item of interest based on the one or more further images of the region within which the second mobile device appears. Step 1310 involves displaying a graphical representation of a region that includes markers for and/or a list of the one or more items of interest, and optionally spatially information for each of the one or more items of interest. FIG. 15 shows an example of a three-dimensional (3D) graphical representation of a region (a wall in this example) that includes a marker 1504 (a 3D pin in this example) specifying precisely where a drywall repair is needed.

As can be appreciated from the above discussion of FIGS. 11 and 12, where the second mobile device is a smartphone or tablet type of mobile computing device, it can include a front side on which is located a display and a front side camera, and a back side on which is located a back side camera. Further, as can be appreciated from the above discussion of FIG. 12, an indicator (e.g., arrow, QR code, etc.) can be displayed on the display of the second mobile device, such that the indicator will be shown in the one or more images of the region captured using the first camera of the first mobile device. The spatial information for an item of interest can be determined by intersecting a ray from a center of the first camera of the first mobile device (e.g., a 360-degree camera) toward the second mobile device (e.g., a smartphone) that appears near the item of interest within the geometry of the space (e.g., a three-dimensional representation of the region). This enables the item of interest (within the graphical representation of the region) to be identified based on the indicator (e.g., arrow, QR code, etc.) on the display of the second mobile device included in the one or more images of the region captured using the first camera of the first mobile device.

In certain embodiments, the frontside camera of the second mobile device (e.g., smartphone) is used to capture a further image that includes the first mobile device, and the further images is used to the reliability and/or accuracy of the spatial information determined for the item of interest. Using computer vision the frontside image (e.g., captured using a smartphone) can be matched against the image from the 360-degree camera (or other type of wide FOV camera) to detect feature point matches. These feature point matches can then be used to calculate a relative pose between the two images. This information can be used to enhance spatial information and make the spatial information more accurate. The relative pose between the two images can be determined using a 5-point relative pose solver in a RANSAC (random sample consensus scheme) loop, but is not limited thereto. The aforementioned items of interest can be, e.g., items that need to be repaired. Alternatively, or additionally, the items of interest can be items for which there is a desire to add smart tags within a 3D graphical representation of a house, rental unit or other geographic region.

A person can be provided with the option of naming an item of interest, e.g., using a touchscreen or other user interface of the second mobile device, right before each instance of step 1306, or right after each instance of step 1306. Alternatively, the user can be provided with the option of naming the various items of interest after step 1308 is performed, and a list of items of interest can be generated between steps 1306 and 1308, or following step 1308, depending upon the specific implementation. Other variations are also possible and within the scope of the embodiments described herein.

In accordance with certain embodiments, various features and functions described herein can be performed under the control of a mobile application that is downloaded to, stored on, and executed by the mobile computing device 102. For example, where the mobile computing device 102 is a smartphone or tablet computing device, various features described herein can be performed under the control of a mobile application, which is also known as a mobile app, or simply an app. Such a mobile application can be available for download from an application store or directly from a software vender, for free, or for a fee. In accordance with certain embodiments of the present technology, the mobile application controls aspects of both the mobile computing device 102 and the remote camera (e.g., 360-degree camera) with which the mobile computing device communicates (e.g., via a wireless or wired communication link), to thereby cause images and corresponding metadata to be captured and stored for use in producing a 3D representation of a room or other environment with spatial coordinates and potentially other information about the items of interest made available and accessible.

In much of the discussion above, there was a description of a smartphone type of mobile computing device communicating with and controlling a 360 degree camera. Nevertheless, it is noted that other types of mobile computing devices can be used instead of a smartphone type of mobile computing device. For just one example, a tablet type of mobile computing device can be used instead of a smartphone type of mobile computing device. Further, other types of cameras can be used instead of a 360 degree camera. For example, such alternative cameras can have FOVs that are less than 360 degrees, e.g., 180 degrees or 120 degrees, but are not limited thereto.

The terms "imaging" and "capturing", as used herein, are used interchangeably typically to refer to the obtaining or taking of images using a camera of a 360-degree camera, other camera, or a mobile computing device. Further, if a room (or a portion thereof) has already been "imaged" or "captured", that means images for that room (or a portion thereof) have already been obtained using the 360-degree camera (or other camera). Such images can be stored, e.g., in the JPEG file format, or some alternative file formal, such as, but not limited to, Exif, TIFF, RAW, GIF, BMP, PNG, PPM, PAM, or WEBP.

A 3D representation (e.g., model) of a room or other environment can be produced by the mobile computing device 102 based on images of the room or other environment capture by the 360-degree camera 302 (or other camera). Alternatively, obtained images and metadata corresponding to the images an be uploaded to a remote system (e.g., 312 in FIG. 2) that includes software (e.g., SfM software) and sufficient processing resources to generate a 3D model of a room based on images of the room within a relatively short period of time.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage.

A computer program may be stored or distributed on a suitable medium, such as an optical storage medium or a solid-state medium supplied together with, or as part of, other hardware, but may also be distributed in other forms, such as via the Internet or other wired or wireless telecommunication systems.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the above detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flow diagrams and/or block diagrams of methods, apparatuses (systems) and computer program products according to embodiments of the disclosure. It will be understood that each block of the flow diagrams in (e.g., in FIGS. 6, 7 and 9) and/or many of the blocks in the block diagrams (e.g., in FIGS. 1, 3 and 4), and combinations of blocks in the flow diagrams and/or block diagrams, can be implemented by computer program instructions. These computer program instructions may be provided to one or more processors of a general purpose computer, special purpose computer, or other programmable data processing apparatus to produce a machine, such that the instructions, which execute via the processor(s) of the computer or other programmable instruction execution apparatus, create a mechanism for implementing the functions/acts specified in the flow diagram and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Computer-readable storage media (medium) exclude (excludes) propagated signals per se, can be accessed by a computer and/or processor(s), and include volatile and non-volatile internal and/or external media that is removable and/or non-removable. For the computer, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects. Similarly, a "first" user, a "second" user, and a "third" user may not imply an ordering of users, but may instead be used for identification purposes to identify different users.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

The previous description of the preferred embodiments is provided to enable any person skilled in the art to make or use the embodiments of the present invention. While the invention has been particularly shown and described with reference to preferred embodiments thereof, it will be understood by those skilled in the art that various changes in form and details may be made therein without departing from the spirit and scope of the invention.

What is claimed:

1. A method for use with a first mobile device comprising a first camera and a second mobile device, the method for determining and using spatial information for two or more items of interest within a graphical representation of a region generated based on one or more images of the region captured using the first camera of the first mobile device, the method comprising:
    capturing one or more images of the region using the first camera of the first mobile device;
    generating or otherwise obtaining the graphical representation of the region based on the one or more images of the region captured using the first camera of the first mobile device, wherein the graphical representation of the region that is generated or otherwise obtained comprises one of a two-dimensional (2D) floorplan of at least a portion of the region, a three-dimensional (3D) floorplan of at least a portion of the region, or a three-dimensional (3D) representation of at least a portion of the region;
    for each item of interest, of the two or more items of interest, using the first camera of the first mobile device to capture one or more further images of the region while the second mobile device is placed in close proximity to the item of interest, and thus, the second mobile device appears in the one or more further images captured for each item of interest of the two or more items of interest;
    for each item of interest, of the two or more items of interest, determining spatial information for the item of interest based on the one or more further images of the region within which the second mobile device appears in close proximity to the item of interest;
    for each item of interest, of the two or more items of interest, using the spatial information that is determined for the item of interest to cause a respective marker to be added to the graphical representation of the region, so that when the graphical representation of the region is displayed respective markers for the two or more items of interest are displayed in relation to the spatial information determined therefor; and
    generating and displaying a list of the two or more items of interest for which the second mobile device appeared in close proximity thereto in one or more of the further images.

2. The method of claim 1, wherein the second mobile device includes a front side on which is located a display and a front side camera, and a back side on which is located a back side camera, and wherein the method includes:
    displaying an indicator on the display of the second mobile device, such that the indicator will be shown in the one or more images of the region captured using the first camera of the first mobile device.

3. The method of claim 2, wherein the determining spatial information, for a said item of interest based on the one or more further images of the region within which the second mobile device appears, comprises intersecting a ray from a center of the first camera of the first mobile device to the second mobile device that appears near said item of interest within the graphical representation of the region.

4. The method of claim 3, wherein the said item of interest within the graphical representation of the region is identified based on the indicator on the display of the second mobile device included in the one or more images of the region captured using the first camera of the first mobile device.

5. The method of claim 2, further comprising, for each item of interest, of the one or more items of interest:
    capturing a further image that includes the first mobile device, using the front side camera of the second mobile device; and
    using the further image, captured using the front side camera of the second mobile device, to increase at least one of reliability or accuracy of the spatial information determined for the item of interest.

6. The method of claim 2, wherein the first camera of the first mobile device comprises a 360-degree camera.

7. The method of claim 2, wherein the second mobile device comprises one of a smartphone or a tablet type of mobile computing device.

8. The method of claim 1, wherein the determining spatial information, for a said item of interest based on the one or more further images of the region within which the second mobile device appears, comprises identifying an arm or other body part of a person holding the second mobile device, and intersecting a ray from a center of the first camera of the first mobile device to the identified arm or other body part of the person located near said item of interest within the graphical representation of the region.

9. One or more processor readable storage devices having instructions encoded thereon which when executed cause one or more processors to perform a method for use with a first mobile device comprising a first camera and a second mobile device, the method for determining spatial information for two or more items of interest within a graphical representation of a region generated based on one or more images of the region captured using the first camera of the first mobile device, the method comprising:
- capturing one or more images of the region using the first camera of the first mobile device;
- generating or otherwise obtaining the graphical representation of the region based on the one or more images of the region captured using the first camera of the first mobile device, wherein the graphical representation of the region that is generated or otherwise obtained comprises one of a two-dimensional (2D) floorplan of at least a portion of the region, a three-dimensional (3D) floorplan of at least a portion of the region, or a three-dimensional (3D) representation of at least a portion of the region;
- for each item of interest, of the two or more items of interest, using the first camera of the first mobile device to capture one or more further images of the region while the second mobile device is placed in close proximity to the item of interest, and thus, the second mobile device appears in the one or more further images captured for each item of interest of the two or more items of interest;
- for each item of interest, of the two or more items of interest, using the spatial information that is determined for the item of interest to cause a respective marker to be added to the graphical representation of the region, so that when the graphical representation of the region is displayed respective markers for the two or more items of interest are displayed in relation to the spatial information determined therefor; and
- generating and displaying a list of the two or more items of interest for which the second mobile device appeared in close proximity thereto in one or more of the further images.

10. The one or more processor readable storage devices of claim 9, wherein the second mobile device includes a front side on which is located a display and a front side camera, and a back side on which is located a back side camera, and wherein the method includes:
- displaying an indicator on the display of the second mobile device, such that the indicator will be shown in the one or more images of the region captured using the first camera of the first mobile device.

11. The one or more processor readable storage devices of claim 10, wherein the second mobile device includes a front side on which is located a display and a front side camera, and a back side on which is located a back side camera, and wherein, wherein the determining spatial information, for a said item of interest based on the one or more further images of the region within which the second mobile device appears, comprises intersecting a ray from a center of the first camera of the first mobile device to the second mobile device that appears near said item of interest within the graphical representation of the region.

12. The one or more processor readable storage devices of claim 11, wherein the said item of interest within the graphical representation of the region is identified based on the indicator on the display of the second mobile device included in the one or more images of the region captured using the first camera of the first mobile device.

13. The one or more processor readable storage devices of claim 10, wherein the method further comprises, for each item of interest, of the one or more items of interest:
- capturing a further image that includes the first mobile device, using the front side camera of the second mobile device; and
- using the further image, captured using the front side camera of the second mobile device, to increase at least one of reliability or accuracy of the spatial information determined for the item of interest.

14. The one or more processor readable storage devices of claim 10, wherein the first camera of the first mobile device comprises a 360-degree camera.

15. The one or more processor readable storage devices of claim 10, wherein the second mobile device comprises one of a smartphone or a tablet type of mobile computing device.

16. The one or more processor readable storage devices of claim 9, wherein the determining spatial information, for a said item of interest based on the one or more further images of the region within which the second mobile device appears, comprises identifying an arm or other body part of a person holding the second mobile device, and intersecting a ray from a center of the first camera of the first mobile device to the identified arm or other body part of the person located near said item of interest within the graphical representation of the region.

17. The one or more processor readable storage devices of claim 9, wherein the method further comprises:
- obtaining a respective name of each of the two or more items of interest and including the names in the list of the two or more items of interest.

18. The one or more processor readable storage devices of claim 17, wherein:
- each of the markers, which is displayed in the graphical representation of the region, is numbered with a respective number; and
- the list includes the respective numbers of the markers such that the respective number of each of the markers, which corresponds to one of the items of interest in the list, is also included in the list next to the name of the one of the items of interest.

19. The method of claim 1, wherein the method further comprises:
- obtaining a respective name of each of the two or more items of interest and including the names in the list of the two or more items of interest.

20. The method of claim 19, wherein:
- each of the markers, which is displayed in the graphical representation of the region, is numbered with a respective number; and
- the list includes the respective numbers of the markers such that the respective number of each of the markers, which corresponds to one of the items of interest in the list, is also included in the list next to the name of the one of the items of interest.

21. The method of claim 1, wherein:
- each of the markers, which is displayed in the graphical representation of the region, is numbered with a respective number; and
- the list includes the respective numbers of the markers.

* * * * *